(12) United States Patent
Iwamoto et al.

(10) Patent No.: US 10,462,320 B2
(45) Date of Patent: Oct. 29, 2019

(54) INFORMATION PROCESSING SYSTEM INCLUDING SETTING VALUES FOR PRINT EXECUTION

(71) Applicant: SEIKO EPSON CORPORATION, Tokyo (JP)

(72) Inventors: Kohei Iwamoto, Matsumoto (JP); Masahiko Hirasawa, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 36 days.

(21) Appl. No.: 15/883,587

(22) Filed: Jan. 30, 2018

(65) Prior Publication Data
US 2018/0249020 A1 Aug. 30, 2018

(30) Foreign Application Priority Data
Feb. 28, 2017 (JP) .................. 2017-036021

(51) Int. Cl.
| G06F 15/00 | (2006.01) |
| G06K 1/00 | (2006.01) |
| G06K 15/00 | (2006.01) |
| H04N 1/00 | (2006.01) |
| H04L 29/08 | (2006.01) |
| G06F 3/12 | (2006.01) |

(52) U.S. Cl.
CPC ......... *H04N 1/0097* (2013.01); *G06F 3/1203* (2013.01); *G06F 3/1231* (2013.01); *G06F 3/1285* (2013.01); *G06K 15/4065* (2013.01); *H04L 67/02* (2013.01); *H04N 1/00954* (2013.01); *G06F 3/1257* (2013.01)

(58) Field of Classification Search
CPC .............. H04N 1/0097; H04N 1/00954; G06F 3/1231; H04L 67/02
USPC ....................... 358/1.18, 1.1, 1.15, 1.14, 1.13
See application file for complete search history.

(56) References Cited

U.S. PATENT DOCUMENTS

| 2007/0185979 A1* | 8/2007 | Yoshida ................ G06F 3/1204 709/220 |
| 2015/0222775 A1 | 8/2015 | Adachi |
| 2018/0213111 A1* | 7/2018 | Hirasawa ........... H04N 1/32122 |

FOREIGN PATENT DOCUMENTS

JP  2015-145940 A  8/2015

* cited by examiner

*Primary Examiner* — Douglas Q Tran
(74) *Attorney, Agent, or Firm* — Workman Nydegger

(57) ABSTRACT

There is provided an information processing system that sets a setting value corresponding to a combination of a model of a printing apparatus and a print medium on which printing is performed to a setting item of the printing apparatus and that executes printing, the system including: a setting value table which stores a candidate setting value that can be set to the setting item in correlation with label information corresponding to each candidate setting value, in which, in a case of setting the setting value to the setting item of the printing apparatus, the information processing system determines the setting value corresponding to the setting item based on print medium information including the label information by using the setting value table, and sets the determined setting value to the setting item.

17 Claims, 14 Drawing Sheets

SLIGHTLY NARROW / NORMAL / SLIGHTLY STRONG / SLIGHTLY COLD / A / D / B
_____/ \_____/
                            A1                                 A2

FIG. 8

| MODEL IDENTIFICATION INFORMATION | PRINTING APPARATUS PROVIDER IDENTIFICATION INFORMATION | PRINT MEDIUM IDENTIFICATION INFORMATION | PRINT MEDIUM INFORMATION |
|---|---|---|---|

| PRINTING APPARATUS IDENTIFICATION INFORMATION | MODEL IDENTIFICATION INFORMATION | PRINT MEDIUM IDENTIFICATION INFORMATION | PRINT MEDIUM INFORMATION |
|---|---|---|---|
| aaa | KS01 | MD01 | ········ |
| aaa | KS01 | MD02 | ········ |
| bbb | KS02 | MD02 | ········ |
| bbb | KS02 | MD03 | ········ |

FIG. 13

| PRINT MEDIUM IDENTIFICATION INFORMATION | SETTING ITEM IDENTIFICATION INFORMATION | WORD INFORMATION | SETTING VALUE |
|---|---|---|---|
| MD01 | PG1 (PLATEN GAP ITEM IDENTIFICATION INFORMATION) | NARROW | 1.0 mm |
| | | SLIGHTLY NARROW | 3.0 mm |
| | | NORMAL | 5.0 mm |
| | | SLIGHTLY WIDE | 7.0 mm |
| | | WIDE | 9.0 mm |
| | TS1 (TENSION ITEM IDENTIFICATION INFORMATION) | WEAK | LEVEL 1 |
| | | SLIGHTLY WEAK | LEVEL 3 |
| | | NORMAL | LEVEL 5 |
| | | SLIGHTLY STRONG | LEVEL 7 |
| | | STRONG | LEVEL 9 |
| | KI1 (SUCTION FORCE ITEM IDENTIFICATION INFORMATION) | WEAK | LEVEL 1 |
| | | SLIGHTLY WEAK | LEVEL 3 |
| | | NORMAL | LEVEL 5 |
| | | SLIGHTLY STRONG | LEVEL 7 |
| | | STRONG | LEVEL 9 |
| | H01 (HEATER TEMPERATURE ITEM IDENTIFICATION INFORMATION) | COLD | 30°C |
| | | SLIGHTLY COLD | 40°C |
| | | NORMAL | 50°C |
| | | SLIGHTLY HOT | 60°C |
| | | HOT | 70°C |
| MD02 | PG1 | NARROW | ····· |
| | | SLIGHTLY NARROW | ····· |
| | | NORMAL | ····· |
| | | SLIGHTLY WIDE | ····· |
| | | WIDE | ····· |
| | TS1 | WEAK | ····· |
| | | SLIGHTLY WEAK | ····· |
| | | NORMAL | ····· |
| | | SLIGHTLY STRONG | ····· |
| | | STRONG | ····· |
| | KI1 | WEAK | ····· |
| | | SLIGHTLY WEAK | ····· |
| | | NORMAL | ····· |
| | | SLIGHTLY STRONG | ····· |
| | | STRONG | ····· |
| | H01 | COLD | ····· |
| | | SLIGHTLY COLD | ····· |
| | | NORMAL | ····· |
| | | SLIGHTLY HOT | ····· |
| | | HOT | ····· |

FIG. 15     42a

| PRINT MEDIUM IDENTIFICATION INFORMATION | SETTING ITEM IDENTIFICATION INFORMATION | SETTING VALUE INDEX | SETTING VALUE |
|---|---|---|---|
| MD01 | PG1 | A | 1.0 mm |
| | | B | 3.0 mm |
| | | C | 5.0 mm |
| | | D | 7.0 mm |
| | | E | 9.0 mm |
| | TS1 | α | LEVEL 1 |
| | | β | LEVEL 3 |
| | | γ | LEVEL 5 |
| | | δ | LEVEL 7 |
| | | ε | LEVEL 9 |
| | KI1 | 1 | LEVEL 1 |
| | | 2 | LEVEL 3 |
| | | 3 | LEVEL 5 |
| | | 4 | LEVEL 7 |
| | | 5 | LEVEL 9 |
| | HO1 | a | 30°C |
| | | b | 40°C |
| | | c | 50°C |
| | | d | 60°C |
| | | e | 70°C |
| MD02 | PG1 | A | ····· |
| | | B | ····· |
| | | C | ····· |
| | | D | ····· |
| | | E | ····· |
| | TS1 | α | ····· |
| | | β | ····· |
| | | γ | ····· |
| | | δ | ····· |
| | | ε | ····· |
| | KI1 | 1 | ····· |
| | | 2 | ····· |
| | | 3 | ····· |
| | | 4 | ····· |
| | | 5 | ····· |
| | HO1 | a | ····· |
| | | b | ····· |
| | | c | ····· |
| | | d | ····· |
| | | e | ····· |

FIG. 16

| MODEL IDENTIFICATION INFORMATION | PRINT MEDIUM IDENTIFICATION INFORMATION | SETTING ITEM IDENTIFICATION INFORMATION | SETTING VALUE INDEX | WORD INFORMATION |
|---|---|---|---|---|
| KS01 | MD01 | PG1 | A | NARROW |
| | | | B | SLIGHTLY NARROW |
| | | | C | NORMAL |
| | | | D | SLIGHTLY WIDE |
| | | | E | WIDE |
| | | TS1 | α | WEAK |
| | | | β | SLIGHTLY WEAK |
| | | | γ | NORMAL |
| | | | δ | SLIGHTLY STRONG |
| | | | ε | STRONG |
| | | KI1 | 1 | WEAK |
| | | | 2 | SLIGHTLY WEAK |
| | | | 3 | NORMAL |
| | | | 4 | SLIGHTLY STRONG |
| | | | 5 | STRONG |
| | | HO1 | a | COLD |
| | | | b | SLIGHTLY COLD |
| | | | c | NORMAL |
| | | | d | SLIGHTLY HOT |
| | | | e | HOT |
| | | ... | | |

22b

INFORMATION PROCESSING SYSTEM INCLUDING SETTING VALUES FOR PRINT EXECUTION

CROSS-REFERENCE TO RELATED APPLICATIONS

The present application claims priority to Japanese Patent Application No. 2017-036021, filed Feb. 28, 2017, which is hereby incorporated by reference in its entirety.

BACKGROUND

1. Technical Field

The present invention relates to an information processing system, a control method of the information processing system, a printing apparatus, and a print medium.

2. Related Art

In related art, a system in which a setting value is set to a setting item (a machine operation parameter) related to printing of a printing apparatus (an image formation apparatus) that can perform printing on different types of printing mediums (paper) and the printing apparatus executes printing (image formation) based on the setting value which is set to the setting item, is known (refer to, for example, JP-A-2015-145940).

Here, as in the printing apparatus described in JP-A-2015-145940, in a printing apparatus that can perform printing on different types of printing mediums, an appropriate setting value to be set to the setting item differs depending on a combination of a model of the printing apparatus and the printing medium on which printing is performed by the printing apparatus. There are many types in models of the printing apparatuses and the print mediums, respectively, and the types are expected to be increased in the future. As a result, management of information on the setting value to be set to the setting item becomes complicated and setting of the setting value to the setting item tends to be difficult for each combination of the model of the printing apparatus and the printing medium.

SUMMARY

An advantage of some aspects of the invention is to simplify management of the information on the setting value to be set to the setting item and to simplify setting of the setting value to the setting item for each combination of the model of the printing apparatus and the print medium.

According to an aspect of the invention, there is provided an information processing system that sets a setting value corresponding to a combination of a model of a printing apparatus and a print medium on which printing is performed to a setting item of the printing apparatus and that executes printing, the system including: a setting value table which stores a candidate setting value that can be set to the setting item in correlation with label information corresponding to each candidate setting value, in which, in a case of setting the setting value to the setting item of the printing apparatus, the information processing system determines the setting value corresponding to the setting item based on print medium information including the label information by using the setting value table, and sets the determined setting value to the setting item.

In this configuration, it is sufficient to manage the print medium information including the label information for each combination of the model of the printing apparatus and the print medium, as information on the setting of the setting value to the setting item of the printing apparatus, without managing a specific setting value to be set to the setting item. Thus, it is possible to simplify management of the information on the setting value to be set to the setting item for each combination of the model of the printing apparatus and the print medium. In addition, the setting of the setting value to the setting item can be performed using the setting value table based on the print medium information. Thus, for example, the user does not need to input a specific setting value for each setting item, thereby simplifying the setting of the setting value to the setting item.

In the information processing system, the label information is obtained by assigning a word with a different description to each candidate setting value for each setting item, the print medium information includes the word corresponding to the setting value to be set to each setting item for the combination of the model of the printing apparatus and the print medium, and the information processing system determines the setting value corresponding to the setting item by specifying the setting value from the word included in the print medium information by using the setting value table.

In this configuration, it is possible to accurately determine the setting value corresponding to the setting item by using the setting value table based on the print medium information.

In the information processing system, the word is obtained by describing a degree of a state of the setting item using a word in a case where the setting value is set to the setting item.

In this configuration, when a person recognizes the word, the person can intuitively and sensibly recognize the degree of the state of the setting item in the case where the setting value corresponding to the word is set to the setting item.

In the information processing system, the label information is obtained by assigning an index represented by a different character to each candidate setting value for each setting item, the print medium information includes the index corresponding to the setting value to be set to each setting item for the combination of the model of the printing apparatus and the print medium, and the information processing system determines the setting value corresponding to the setting item by specifying the setting value from the index included in the print medium information by using the setting value table.

In this configuration, it is possible to accurately determine the setting value corresponding to the setting item by using the setting value table based on the print medium information.

In the information processing system, the label information includes information obtained by assigning a word with a different description to each candidate setting value for each setting item and information obtained by assigning an index represented by a different character to each candidate setting value for each setting item, the print medium information includes the index corresponding to the setting value to be set to each setting item for the combination of the model of the printing apparatus and the print medium, the setting value table stores the setting value in correlation with the word, the information processing system includes a label correspondence table that stores the word in correlation with the index, and the information processing system determines the setting value corresponding to the setting item by specifying the word from the index included in the print medium information by using the label correspondence table and specifying the setting value corresponding to the specified word by using the setting value table.

In this configuration, it is possible to accurately set the setting value to the setting item of the printing apparatus based on the print medium information including the index by using the label correspondence table and the setting value table.

In the information processing system, the word is obtained by describing a degree of a state of the setting item using a word in a case where the setting value is set to the setting item.

In this configuration, when a person recognizes the word, the person can intuitively and sensibly recognize the degree of the state of the setting item in the case where the setting value corresponding to the word is set to the setting item.

In the information processing system, the label correspondence table is stored in an apparatus that can perform communication with the printing apparatus via a network.

In this configuration, the apparatus that can perform communication with the printing apparatus via a network can centrally manage a correspondence relationship between the index and the word for each combination of the model of the printing apparatus and the print medium.

In the information processing system, the setting value table is included in the printing apparatus.

In this configuration, when setting the setting value to the setting item, the printing apparatus can set the setting value to the setting item by using the setting value table stored in the printing apparatus without accessing an external apparatus to acquire required information, and thereby improving the processing efficiency.

In the information processing system, the print medium information is recorded in the print medium in a readable state.

In this configuration, the printing apparatus can acquire the print medium information by reading the print medium information from the print medium. Thereby, for example, the printing apparatus does not need to access an external apparatus so as to acquire the print medium information, and thus the processing efficiency can be improved. Further, the user does not need to perform work such as inputting of the print medium information, and thus convenience of the user can be improved.

In the information processing system, the print medium information is recorded in an IC tag attached to a portion of the print medium that is not consumed by the printing apparatus among portions of the print medium.

In this configuration, the printing apparatus can accurately acquire the print medium information from the IC tag attached to the print medium which is actually loaded into the printing apparatus.

In the information processing system, the print medium information is stored in a server that can perform communication with the printing apparatus via a global network.

In this configuration, the server can provide the print medium information to an apparatus that can perform communication with the server as necessary.

In the information processing system, processing of determining the setting value from the label information and setting the determined setting value to the setting item is performed at a timing when the print medium is loaded into the printing apparatus.

In this configuration, when the print medium loaded into the printing apparatus is replaced, an appropriate setting value corresponding to the replaced print medium can be set to the setting item of the printing apparatus.

In the information processing system, processing of determining the setting value from the label information and setting the determined setting value to the setting item is performed when the print medium is loaded into the printing apparatus and printing is performed.

In this configuration, before printing is performed, an appropriate setting value corresponding to the print medium on which printing is actually performed can be set to the setting item of the printing apparatus.

In the information processing system, the setting item includes an item related to a mechanism to be used for printing on the print medium by the printing apparatus.

In this configuration, the setting value can be accurately set to the item related to the mechanism to be used for printing on the print medium by the printing apparatus.

In the information processing system, the setting item includes an item related to image processing to be executed when an image processing apparatus, which generates print data to be output to the printing apparatus, generates the print data.

In this configuration, the setting value can be accurately set to the item related to image processing to be executed when the image processing apparatus generates the print data.

According to another aspect of the invention, there is provided a control method of an information processing system that sets a setting value corresponding to a combination of a model of a printing apparatus and a print medium on which printing is performed to a setting item of a printing apparatus and executes printing, the method including: acquiring label information from print medium information; determining the setting value corresponding to the setting item by using a setting value table which stores a candidate setting value that can be set to the setting item in correlation with the label information corresponding to each candidate setting value; and setting the determined setting value to the setting item.

In this configuration, it is sufficient to manage the print medium information including the label information for each combination of the model of the printing apparatus and the print medium, as information on the setting of the setting value to the setting item of the printing apparatus, without managing a specific setting value to be set to the setting item. Thus, it is possible to simplify management of the information on the setting value to be set to the setting item for each combination of the model of the printing apparatus and the print medium. In addition, the setting of the setting value to the setting item can be performed using the setting value table based on the print medium information. Thus, for example, the user does not need to input a specific setting value for each setting item, thereby simplifying the setting of the setting value to the setting item.

According to still another aspect of the invention, there is provided a printing apparatus that performs printing on a print medium, the apparatus including: a setting value table which stores a candidate setting value that can be set to a setting item related to the print medium in correlation with label information corresponding to each candidate setting value, in which the printing apparatus determines the setting value based on print medium information including the label information corresponding to the setting value to be set to the setting item by using the setting value table, and performs printing by setting the determined setting value to the setting item.

In this configuration, it is possible to simplify management of the information on the setting value to be set to the setting item and to simplify setting of the setting value to the setting item for each combination of the model of the printing apparatus and the print medium.

According to still another aspect of the invention, there is provided a print medium in which print medium information including label information obtained by expressing a setting value to be set to a setting item of a printing apparatus in an abstract way is recorded in an IC tag in a readable state.

In this configuration, it is possible to simplify management of the information on the setting value to be set to the setting item and to simplify setting of the setting value to the setting item for each combination of the model of the printing apparatus and the print medium.

BRIEF DESCRIPTION OF THE DRAWINGS

The invention will be described with reference to the accompanying drawings, wherein like numbers reference like elements.

FIG. 6 is a diagram illustrating a print medium information registration screen.

FIG. 7 is a diagram illustrating print medium information.

FIG. 8 is a diagram illustrating a medium list.

FIG. 13 is a diagram illustrating a setting value table.

FIG. 15 is a diagram illustrating the setting value table.

FIG. 16 is a diagram illustrating a label correspondence table.

DESCRIPTION OF EXEMPLARY EMBODIMENTS

Hereinafter, embodiments according to the invention will be described with reference to the drawings.

First Embodiment

Figure 1:
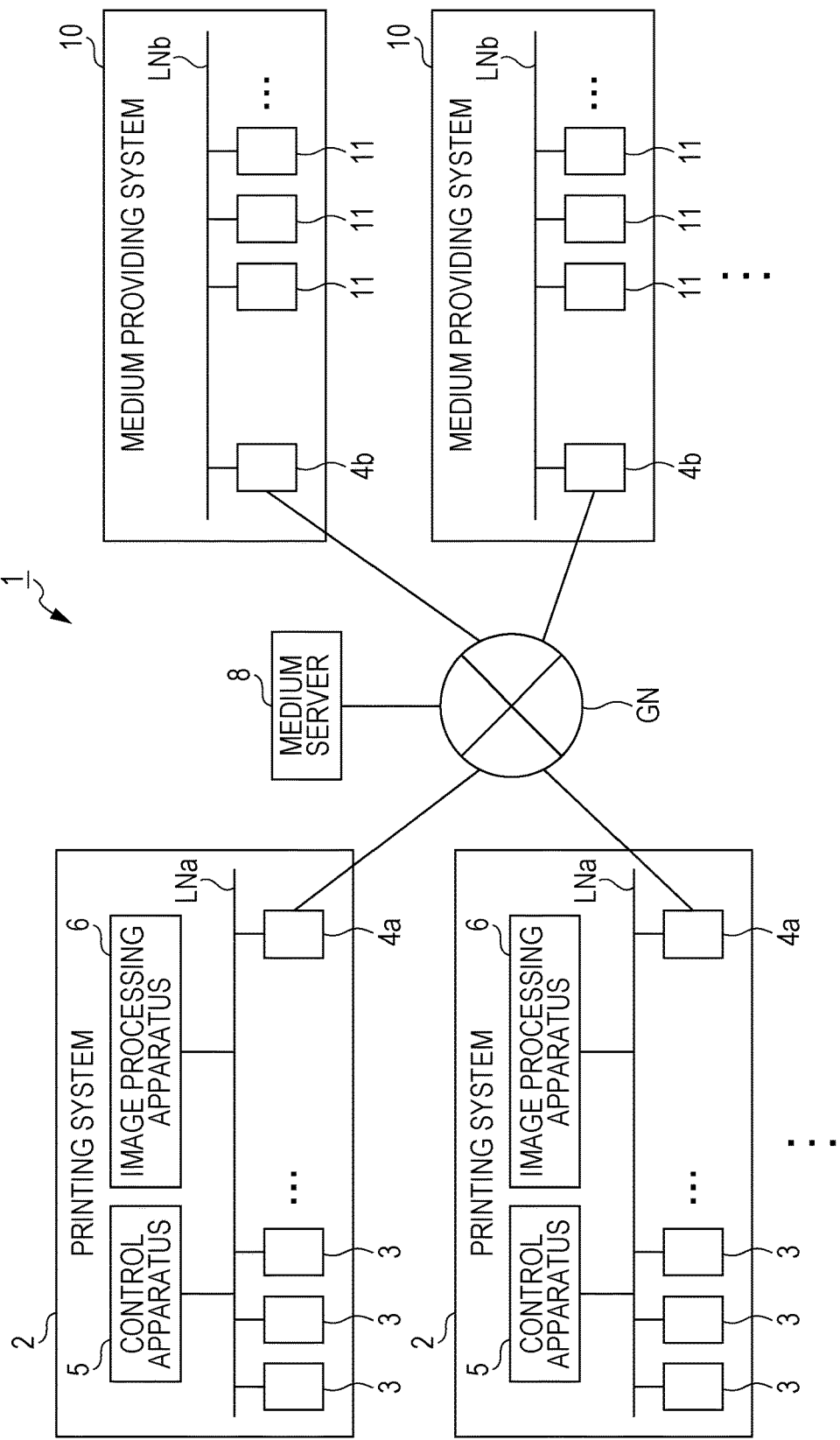
FIG. 1 is a diagram illustrating a configuration of an information processing system according to a first embodiment.

FIG. 1 is a diagram illustrating a configuration of an information processing system 1 according to the present embodiment.

As illustrated in FIG. 1, the information processing system 1 includes a plurality of printing systems 2 connected to a global network GN including the Internet, a telephone network, and other communication networks. The printing system 2 is a system provided in a facility at which printing by a printing apparatus 3 is performed. The facility at which the printing system 2 is provided is, for example, a factory of a company that performs printing according to a request from a customer by the printing apparatus 3 so as to generate a printed matter and performs a service for providing the generated printed matter.

In the following description, a person who use the printing apparatus 3 is collectively referred to as a "user".

The printing system 2 includes a local area network LNa. The local area network LNa is a computer network that is provided in the facility provided with the printing system 2.

A communication apparatus 4a is connected to the local area network LNa. The communication apparatus 4a is an interface apparatus that connects the local area network LNa and the global network GN. The communication apparatus 4a has a function as a modem (or an optical network unit (GNU)), a function as a router, a network address translation (NAT) function, a function as a dynamic host configuration protocol (DHCP) server, and the like. The communication apparatus 4a transfers data which is transmitted and received between an apparatus connected to the local area network LNa and an apparatus connected to the global network GN when communication is performed between the apparatuses. In FIG. 1, although the communication apparatus 4a is represented by one block, the communication apparatus 4a may be configured to include a plurality of apparatuses according to the function.

A plurality of printing apparatuses 3 are connected to the local area network LNa. The printing apparatus 3 is an apparatus into which a print medium is loaded and which has a function of performing printing on the loaded print medium. The print medium is not limited to paper of a paper medium, and means a medium such as a film or fiber which can be loaded into the printing apparatus 3 and on which printing by the printing apparatus 3 can be performed. A configuration, a function, and processing of the printing apparatus 3 will be described later.

A state where the print medium is loaded into the printing apparatus 3 means a state where the printing apparatus 3 is ready to perform printing on the print medium, and differs depending on a type of the print medium (cut paper, roll paper, or the like).

A control apparatus 5 and an image processing apparatus 6 are connected to the local area network LNa. A configuration, a function, and processing of each of the apparatuses will be described later.

As illustrated in FIG. 1, the information processing system 1 includes a medium server 8 (server) connected to the global network GN. The medium server 8 is a server apparatus which can perform communication with at least the printing apparatus 3, the control apparatus 5, and a terminal 11 to be described that correspond to a client. In FIG. 1, although the medium server 8 is represented by one block, this does not mean that the medium server 8 is configured with a single server apparatus. For example, the medium server 8 may be configured to include a plurality of server apparatuses. That is, the medium server 8 may have any configuration as long as the medium server 8 can execute processing to be described. A configuration, a function, and processing of the medium server 8 will be described later.

As illustrated in FIG. 1, the information processing system 1 includes a plurality of medium providing systems 10 connected to the global network GN. The medium providing system 10 is a system that is provided in a facility managed by an entity providing the print medium. The entity providing the print medium is, for example, a vendor that manufactures and sells the print medium. The facility managed by the entity providing the print medium is, for example, an office of the vendor. Hereinafter, the entity providing the print medium will be referred to as a "medium provider" for convenience. The medium provider is a concept including both of an organization providing the print medium and a person belonging to the organization.

The medium providing system 10 includes a local area network LNb. The local area network LNb is a computer network that is provided in the facility provided with the medium providing system 10. A communication apparatus 4b is connected to the local area network LNb. The communication apparatus 4b is an apparatus having a similar function as that of the communication apparatus 4a.

A plurality of terminals 11 are connected to the local area network LNb. The terminal 11 is a computer including at least a display section such as a liquid crystal display panel and an input section such as a mouse and a keyboard. A browser is installed in the terminal 11. The terminal 11 is used by the medium provider.

Figure 2:
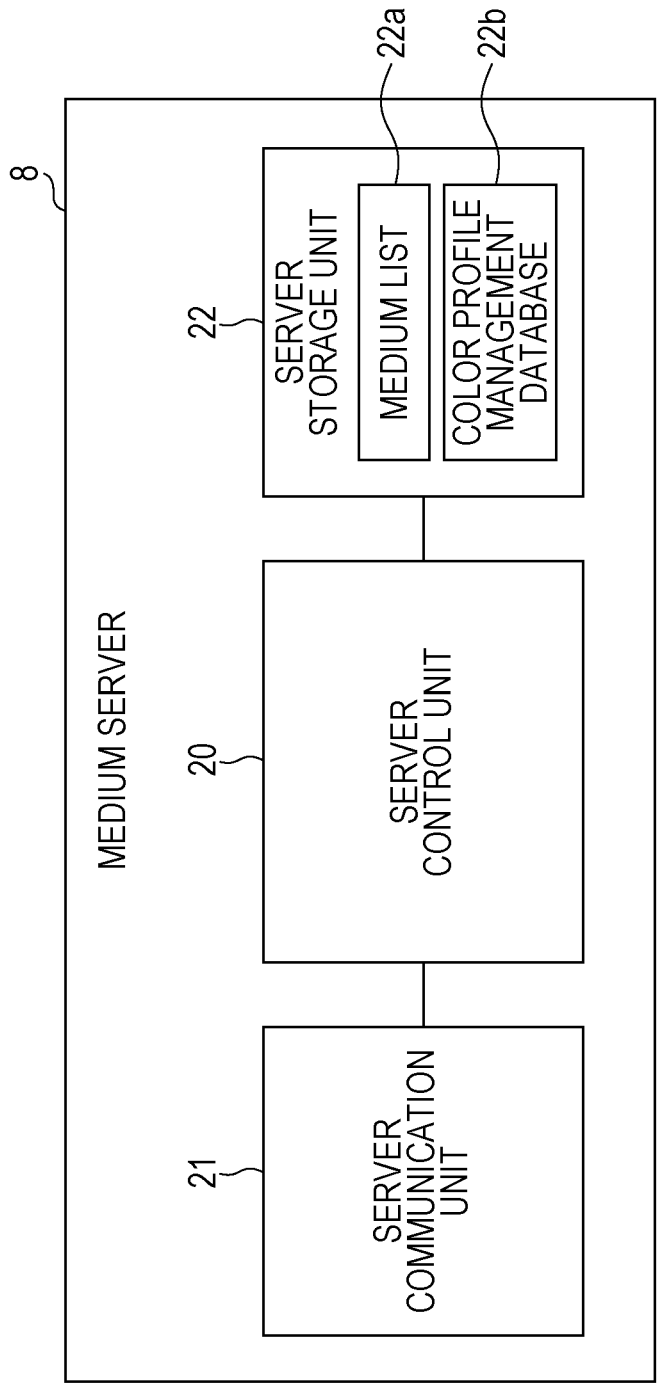
FIG. 2 is a block diagram illustrating a functional configuration of a medium server.

FIG. 2 is a block diagram illustrating a functional configuration of the medium server 8.

As illustrated in FIG. 2, the medium server 8 includes a server control unit 20, a server communication unit 21, and a server storage unit 22.

The server control unit 20 includes a CPU, a ROM, a RAM, an ASIC, a signal processing circuit, and the like, and controls each unit of the medium server 8. The CPU of the server control unit 20 executes processing by hardware and software. For example, the CPU of the server control unit 20 executes processing by reading a program stored in the ROM or the server storage unit 22 to be described into the RAM, executes processing by a function implemented in the ASIC, or executes processing by performing signal processing by the signal processing circuit.

Under a control of the server control unit 20, the server communication unit 21 performs communication with an apparatus connected to the global network GN according to a predetermined communication standard.

The server storage unit 22 includes a storage device including a nonvolatile memory, and stores various types of data. The server storage unit 22 stores a medium list 22a and a color profile management database 22b. The medium list 22a and the color profile management database 22b will be described later.

Figure 3:
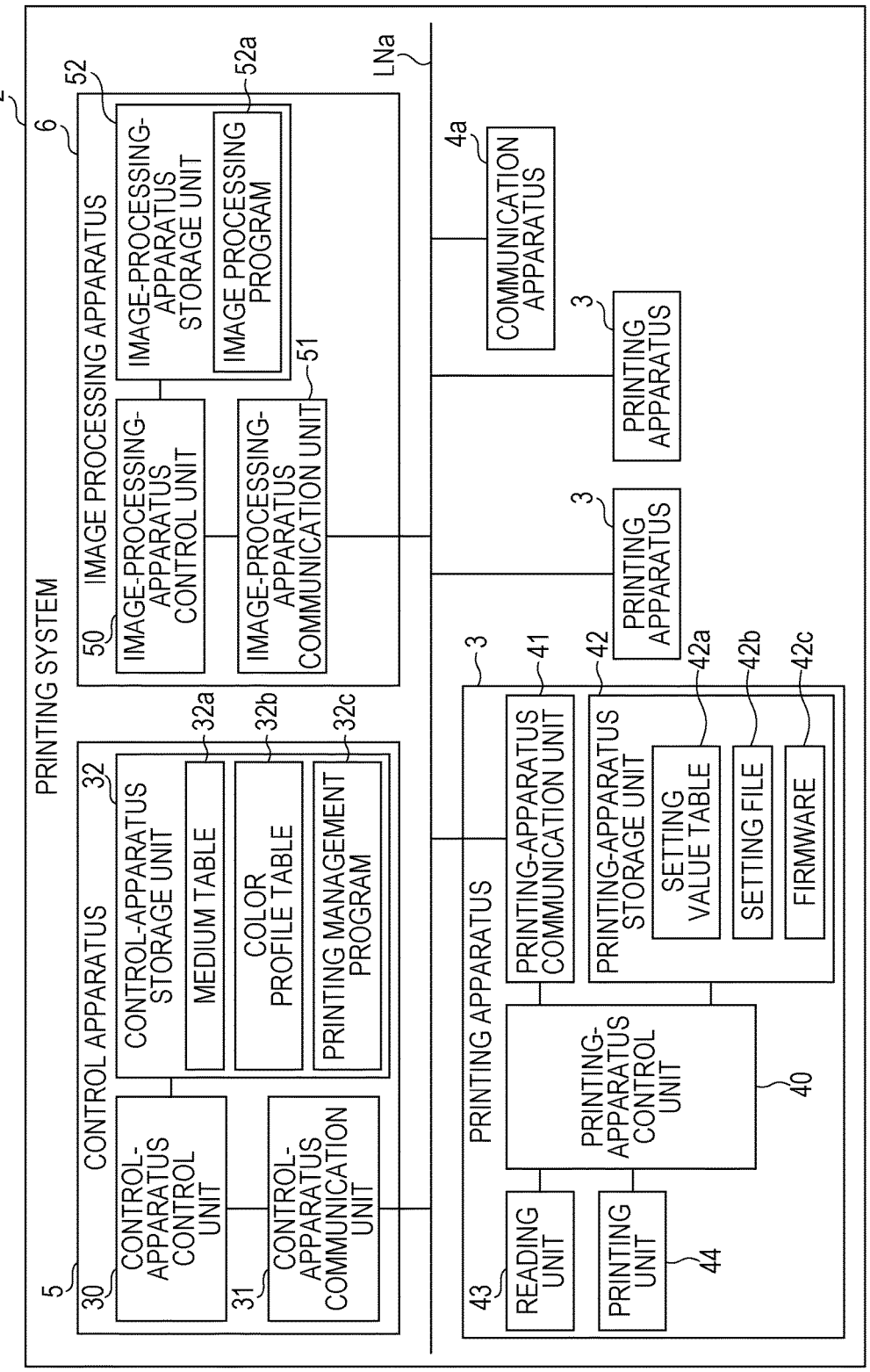
FIG. 3 is a block diagram illustrating functional configurations of apparatuses included in a printing system.

FIG. 3 is a block diagram illustrating functional configurations of apparatuses included in the printing system 2.

The control apparatus 5 is a computer that functions as a server with respect to the image processing apparatus 6 and the printing apparatus 3 functioning as a client in the local area network LNa.

As illustrated in FIG. 3, the control apparatus 5 includes a control-apparatus control unit 30, a control-apparatus communication unit 31, and a control-apparatus storage unit 32.

The control-apparatus control unit 30 includes a CPU, a ROM, a RAM, an ASIC, a signal processing circuit, and the like, and controls each unit of the control apparatus 5. The control-apparatus control unit 30 executes processing by hardware and software. For example, the CPU of the control-apparatus control unit 30 executes processing by reading a program stored in the ROM or the control-apparatus storage unit 32 to be described into the RAM, executes processing by a function implemented in the ASIC, or executes processing by performing signal processing by the signal processing circuit.

Under a control of the control-apparatus control unit 30, the control-apparatus communication unit 31 performs communication with the apparatus connected to the local area network LNa and the apparatus connected to the global network GN according to a predetermined communication standard.

The control-apparatus storage unit 32 includes a nonvolatile memory such as an EEPROM, and stores various types of data. The control-apparatus storage unit 32 stores a medium table 32a and a color profile table 32b. The data will be described later.

A printing management program 32c is installed in the control apparatus 5. The control-apparatus control unit 30 reads and executes the printing management program 32c, and executes various processing to be described by a function of the printing management program 32c.

The printing apparatus 3 is an ink jet printer into which different types of print medium can be loaded and which forms dots by ejecting an ink by an ink jet head so as to print an image on the loaded print medium.

In particular, the printing apparatus 3 according to the present embodiment is a so-called large format printer (LFP), and a large medium as the print medium can be loaded into the printing apparatus 3. As an example, in a case of cut paper, "A0"-sized paper as the print medium can be loaded into the printing apparatus 3, and in a case of roll paper, paper having a width wider than "900 mm" can be loaded into the printing apparatus 3.

As illustrated in FIG. 3, the printing apparatus 3 includes a printing-apparatus control unit 40, a printing-apparatus communication unit 41, a printing-apparatus storage unit 42, a reading unit 43, and a printing unit 44.

The printing-apparatus control unit 40 includes a CPU, a ROM, a RAM, an ASIC, a signal processing circuit, and the like, and controls each unit of the printing apparatus 3. The printing-apparatus control unit 40 executes processing by hardware and software. For example, the CPU of the printing-apparatus control unit 40 executes processing by reading a program stored in the ROM or the printing-apparatus storage unit 42 to be described into the RAM, executes processing by a function implemented in the ASIC, or executes processing by performing signal processing by the signal processing circuit.

Under a control of the printing-apparatus control unit 40, the printing-apparatus communication unit 41 performs communication with the apparatus connected to the local area network LNa and the apparatus connected to the global network GN according to a predetermined communication standard.

The printing-apparatus storage unit 42 includes a nonvolatile memory such as an EEPROM, and stores various types of data. The printing-apparatus storage unit 42 stores a setting value table 42a and a setting file 42b. The setting value table 42a and the setting file 42b will be described later.

Firmware 42c is installed in the printing apparatus 3. The printing-apparatus control unit 40 reads and executes the firmware 42c, and executes various processing to be described by a function of the firmware 42c.

The reading unit 43 includes a reading device including an antenna which transmits and receives a radio signal to and from an IC tag and an RF circuit. The reading unit 43 reads data from the IC tag by performing communication with the IC tag according to a predetermined communication standard. The IC tag from which data is read by the reading unit 43 is a passive type IC tag in which an IC included in the IC tag is driven by power induced in the antenna of the IC tag.

The printing unit 44 includes an ink jet head that ejects an ink onto the print medium loaded into the printing apparatus 3 so as to form dots, a platen that is provided at a position opposite to the ink jet head and supports the print medium, a suction fan that appropriately maintains a distance between the ink jet head and the print medium positioned in the platen, a carriage that scans the ink jet head, a transport mechanism that transports the print medium, a tension mechanism that adjusts a tension acting on the print medium transported by the transport mechanism, and a heater that dries the print medium to which the ink is adhered. The printing-apparatus control unit 40 controls the printing unit 44 so as to print an image on the print medium loaded into the printing apparatus 3.

The printing apparatus 3 has a plurality of printing modes. The printing modes are provided for each combination of a print resolution and the number of passes. The number of passes means the number of times the ink jet head is passed when printing an image on the same region of the print medium in printing on the print medium. The print resolution and the number of passes can be set by a user, and the printing mode is determined by setting the print resolution and the number of passes.

The image processing apparatus 6 is a computer functioning as a host computer in a relationship with the printing apparatus 3.

As illustrated in FIG. 3, the image processing apparatus 6 includes an image-processing-apparatus control unit 50, an image-processing-apparatus communication unit 51, and an image-processing-apparatus storage unit 52.

The image-processing-apparatus control unit 50 includes a CPU, a ROM, a RAM, an ASIC, a signal processing circuit, and the like, and controls each unit of the image processing apparatus 6. The image-processing-apparatus control unit 50 executes processing by hardware and software. For example, the CPU of the image-processing-apparatus control unit 50 executes processing by reading a program stored in the ROM or the image-processing-apparatus storage unit 52 to be described into the RAM, executes processing by a function implemented in the ASIC, or executes processing by performing signal processing by the signal processing circuit.

Under a control of the image-processing-apparatus control unit 50, the image-processing-apparatus communication unit 51 performs communication with the apparatus connected to the local area network LNa and the apparatus connected to the global network GN according to a predetermined communication standard.

The image-processing-apparatus storage unit 52 includes a nonvolatile memory such as an EEPROM, and stores various types of data.

An image processing program 52a is installed in the image processing apparatus 6. The image-processing-apparatus control unit 50 reads and executes the image processing program 52a, and executes various processing to be described by a function of the image processing program 52a.

The image processing program 52a includes raster image processor (RIP) software for generating raster data of an image to be printed by the printing apparatus 3. The raster data is data for holding a degree of each of colors (for example, cyan (C), magenta (M), yellow (Y), and black (K)) of the ink which can be ejected by the printing apparatus 3 for each of the dots arranged in a dot matrix shape, as a gradation value with a predetermined gradation.

The image-processing-apparatus control unit 50 generates the raster data using the color profile by a function of the RIP software. As the color profile, for example, an international color consortium (ICC) profile is widely used. An appropriate color profile which is used when generating the raster data differs depending on a combination of a model of the printing apparatus 3 that performs printing based on the raster data, the print medium on which printing is performed by the printing apparatus 3, and the printing mode of the printing apparatus 3.

As described above, the printing-apparatus storage unit 42 of the printing apparatus 3 stores the setting file 42b. The setting file 42b is a file in which information for identifying setting items (hereinafter, referred to as "setting item identification information") and setting values which are set to the setting items are described in correlation with each other. The setting items include an item related to a mechanism to be used for printing on the print medium by the printing apparatus 3. In the present embodiment, as the setting items, a platen gap item, a tension item, a suction force item, and a heater temperature item are provided.

The platen gap item is a setting item related to a separation distance (hereinafter, referred to as a "platen gap") between the ink jet head and the platen. A range of the platen gap differs depending on the model of the printing apparatus 3. The setting value which is set to the platen gap item is a value indicating the platen gap.

The tension item is a setting item related to the tension (hereinafter, simply referred to as "tension") acting on the print medium by the tension mechanism. In the present embodiment, degrees of the tension are represented in steps according to levels. The number of the steps of the levels differs depending on the model of the printing apparatus 3. The setting value which is set to the tension item is a tension level.

The suction force item is a setting item related to the suction force of the suction fan. In the present embodiment, degrees of the suction force of the suction fan are represented in steps according to levels. The number of the steps of the levels differs depending on the model of the printing apparatus 3. The setting value which is set to the suction force item is a suction force level of the suction fan.

The heater temperature item is a setting item related to a heater temperature. A range of the heater temperature differs depending on the model of the printing apparatus 3. The setting value which is set to the heater temperature item is a value indicating the heater temperature.

The setting items described in the present embodiment are an example for simplifying the explanation, and other setting items may be provided in addition to the exemplified setting items or instead of at least a part of the exemplified setting items. The setting items include, for example, a setting item related to a transport speed when the print medium is transported by the transport mechanism, a setting item related to a frequency of cleaning of the ink jet head, and the like.

When performing printing on the print medium, the printing apparatus 3 reflects the setting values which are set to the setting items, and performs printing. For example, when performing printing on the print medium, the printing apparatus 3 sets the platen gap to the setting value which is set to the platen gap item, sets the tension level to the setting value which is set to the tension item, sets the suction force level of the suction fan to the setting value which is set to the suction force item, sets the heater temperature to the setting value which is set to the heater temperature item, and then performing printing.

An appropriate setting value to be set to the setting item differs depending on a combination of the model of the printing apparatus 3 and the print medium on which printing is performed by the printing apparatus 3. Since the print medium has different characteristics (a material, a size, a strength, and the like) depending on the type of the print medium and a specification of the printing apparatus 3 differs depending on the model of the printing apparatus 3, a degree of improvement in print quality differs depending on the combination of the model of the printing apparatus 3 and the print medium loaded into the printing apparatus 3.

In this regard, for each print medium provided by the medium provider, an appropriate setting value to be set to the setting item can be determined for each model of the printing apparatus 3 by the medium provider. The appropriate setting value can be registered in the medium list 22*a* (registration of the appropriate setting value in the medium list 22*a* will be described later). In this case, it is necessary to determine and register a specific setting value of each of the setting items for each model of the printing apparatus 3, and as a result, there is a possibility that work of the medium provider becomes complicated. In addition, in the information processing system 1, it is necessary to manage the specific setting value of each of the setting items for each combination of the model of the printing apparatus 3 and the print medium, and as a result, there is a possibility that management becomes complicated.

Further, in a case where printing is performed on one print medium by the printing apparatus 3 of one model, there is a need to intuitively image the appropriate setting value to be set to the setting item to a user such that convenience of the user can be improved.

Based on the above, each apparatus of the information processing system 1 executes the following processing.

Processing of Information Processing System 1 in a Case where Print Medium Information is Registered in Medium List 22*a*

First, an operation of each apparatus of the information processing system 1 in a case where print medium information (to be described later) is registered in the medium list 22*a* by the medium provider will be described.

Figure 4:
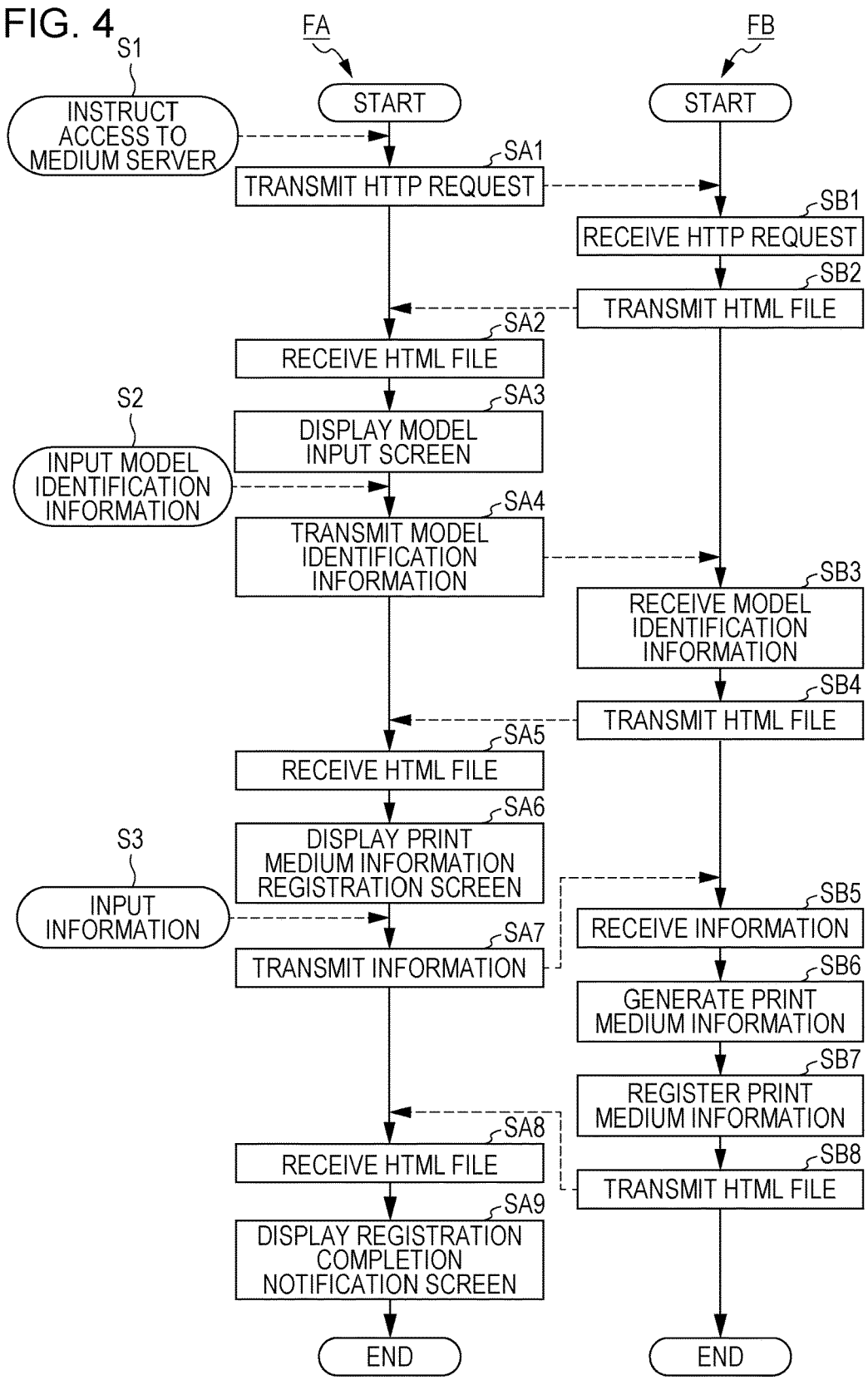
FIG. 4 is a flowchart illustrating operations of a terminal and the medium server.

FIG. 4 is a flowchart illustrating operations of the terminal 11 and the medium server 8 in a case where the print medium information is registered in the medium list 22*a*. A flowchart FA of FIG. 4 illustrates the operation of the terminal 11, and a flowchart FB of FIG. 4 illustrates the operation of the medium server 8.

In an explanation with reference to the flowchart of FIG. 4, it is assumed that the medium provider intends to register the print medium information related to an appropriate setting value to be set to the setting item of the printing apparatus 3 of a specific model in a case where the printing apparatus 3 of the specific model performs printing on a specific print medium provided by the medium provider.

Although a detailed description is omitted, security communication is performed between the medium server 8 and other apparatuses by using an encryption technology, a virtual private line technology, or the like in related art. In addition, the medium server 8 performs appropriate authentication as necessary in a case where the medium server 8 is accessed from another apparatus.

As illustrated in the flowchart FA of FIG. 4, in a case of registering the print medium information, the medium provider activates a browser of the terminal 11, and instructs an access to a predetermined URL of the medium server 8 (step S1). The URL is notified to the medium provider in advance in a predetermined manner.

In response to the instruction of the medium provider, the terminal 11 transmits a corresponding HTTP request to the medium server 8 (step SA1).

As illustrated in the flowchart FB of FIG. 4, the server control unit 20 of the medium server 8 receives the HTTP request by controlling the server communication unit 21 (step SB1).

Next, the server control unit 20 generates an HTML file for displaying a model input screen G1 (FIG. 5) based on the received HTTP, and transmits the HTML file to the terminal 11 (step SB2).

As illustrated in the flowchart FA of FIG. 4, the terminal 11 receives the HTML file (step SA2).

Next, the terminal 11 displays the model input screen G1 on the display section based on the received HTML file (step SA3).

Figure 5:
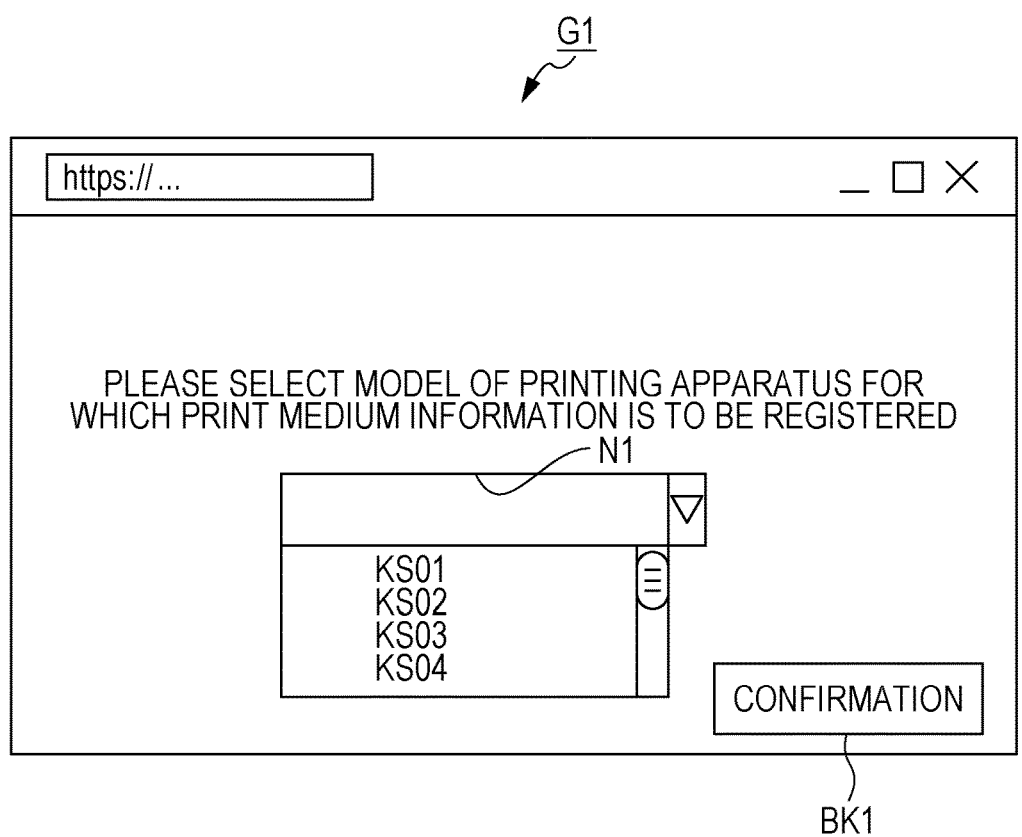
FIG. 5 is a diagram illustrating a model input screen.

FIG. 5 is a diagram illustrating the model input screen G1.

As illustrated in FIG. 5, the model input screen G1 includes an input field N1 for inputting information for identifying the model of the printing apparatus 3 (hereinafter, referred to as "model identification information"). The input field N1 is a pull-down menu, and on the pull-down menu, items of the model identification information of the selectable models are listed. By selecting one item of the model identification information from the items of the model identification information listed on the pull-down menu, the model identification information can be input into the input field N1. The model input screen G1 includes a confirmation button BK1 for confirming the input of the model identification information into the input field N1.

The medium provider inputs the model identification information indicating the model of the printing apparatus 3 for which the print medium information is to be registered, on the model input screen G1, and operates the confirm button BK1 (step S2).

Hereinafter, a model indicated by the model identification information which is input into the input field N1 by the medium provider is referred to as a "selected model".

In response to the operation of the confirmation button BK1, the terminal 11 transmits the model identification information which is input by the medium provider to the medium server 8 by a function of a script implemented in the HTML file (step SA4).

As illustrated in the flowchart FB of FIG. 4, the server control unit 20 of the medium server 8 receives the model identification information by controlling the server communication unit 21 (step SB3).

Next, the server control unit 20 acquires model-related information based on the received model identification information, generates an HTML file for displaying a print medium information registration screen G2 (FIG. 6) based on the acquired model-related information, and transmits the HTML file to the terminal 11 (step SB4). The model-related information is information which is required for generation of the HTML file for displaying the print medium information registration screen G2. The model-related information is registered in a predetermined database stored in the server storage unit 22 in correlation with the model identification information.

As illustrated in the flowchart FA of FIG. 4, the terminal 11 receives the HTML file (step SA5).

Next, the terminal 11 displays the print medium information registration screen G2 on the display section based on the received HTML file (step SA6).

Figure 6:
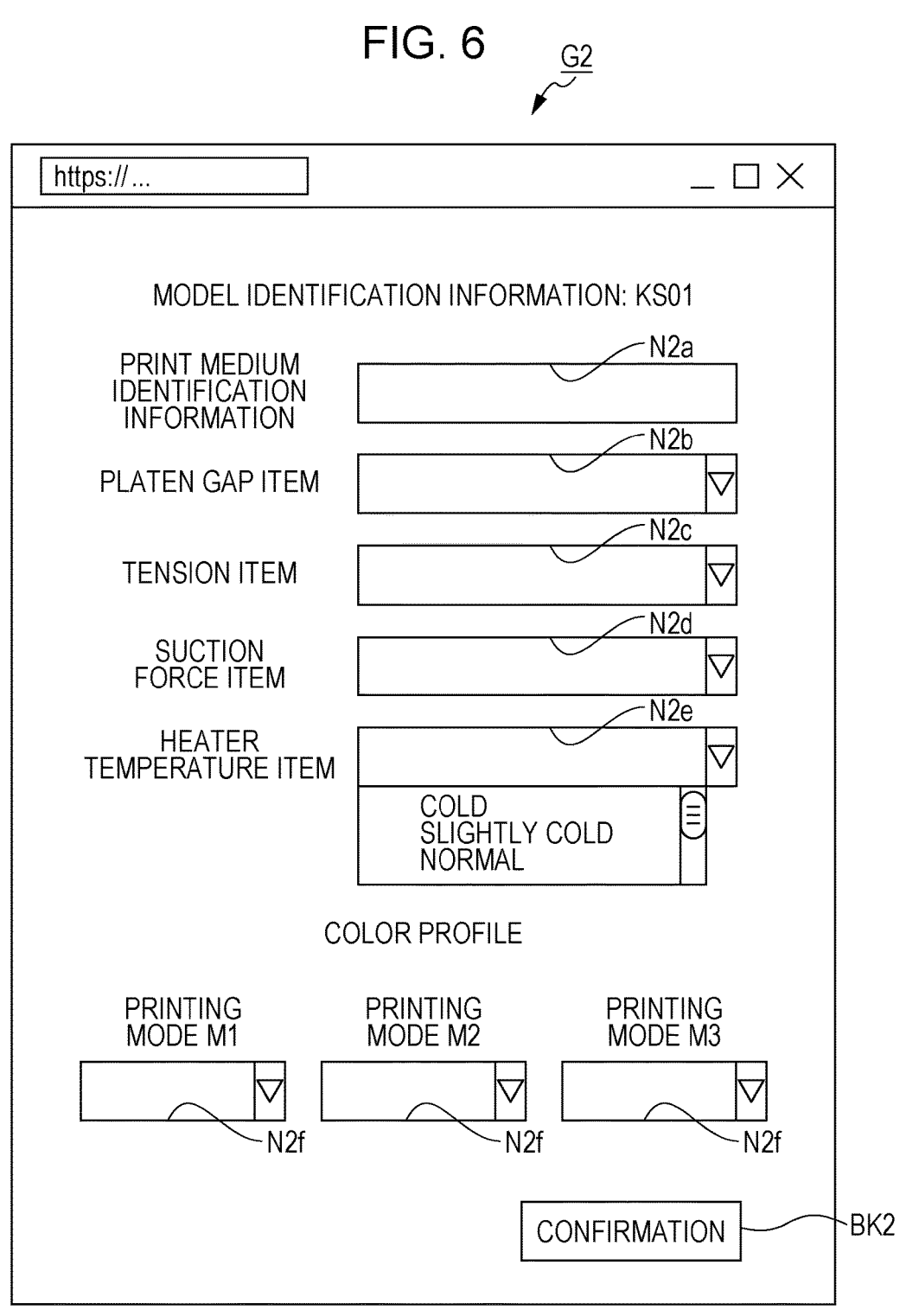

FIG. 6 is a diagram illustrating the print medium information registration screen G2.

As illustrated in FIG. 6, the print medium information registration screen G2 includes an input field N2*a* for inputting information for identifying the print medium (hereinafter, referred to as "print medium identification information"). The medium provider inputs the print medium identification information of the print medium for which the print medium information is to be registered, into the input field N2a.

Hereinafter, the print medium for which print medium information is to be registered is referred to as "registration target print medium" as appropriate.

As illustrated in FIG. 6, the print medium information registration screen G2 includes an input field N2b for inputting word information on the platen gap item, an input field N2c for inputting word information on the tension item, an input field N2d for inputting word information on the suction force item, and an input field N2e for inputting word information on the heater temperature item.

In the following, the word information will be described in detail by taking the platen gap item as an example.

Here, for the platen gap of the printing apparatus 3 of one model, it is assumed that a range of the platen gap is "1.0 mm" to "9.0 mm". In this case, candidate setting values, which can be set to the platen gap item of the printing apparatus 3 of one model, are predetermined in advance. In the present example, as the candidate setting values which can be set to the platen gap item of the printing apparatus 3 of one model, it is assumed that five values of "1.0 mm", "3.0 mm", "5.0 mm", "7.0 mm", and "9.0 mm" are predetermined in advance.

The word information is assigned in advance to each of the candidate setting values. The word information is a word expressing the candidate setting value in an abstract way.

In the present example, "narrow" word information is assigned to the candidate setting value of "1.0 mm", "slightly narrow" word information is assigned to the candidate setting value of "3.0 mm", "normal" word information is assigned to the candidate setting value of "5.0 mm", "slightly wide" word information is assigned to the candidate setting value of "7.0 mm", and "wide" word information is assigned to the candidate setting value of "9.0 mm".

As illustrated in the present example, the word information is obtained by describing a degree of a state of the setting item using a word in a case where the corresponding candidate setting value is set to the setting item. That is, the word information is a word such that a person can intuitively and sensibly recognize the degree of the state of the setting item in the case where the corresponding candidate setting value is set to the setting item. In addition, the word information with different description word is assigned to each of the candidate setting values.

In the present example, as described above, the "narrow" word information is assigned to the candidate setting value of "1.0 mm". Here, based on a fact that the range of the platen gap is "1.0 mm" to "9.0 mm" and a fact that the "slightly narrow" word information, the "normal" word information, the "slightly wide" word information, and the "wide" word information are assigned to each of other candidate setting values, the following can be said. That is, it can be said that the "narrow" word information is obtained by describing the degree of the state of the platen gap (the state of the setting item) using a word in a case where the setting value of "1.0 mm" is set to the platen setting item. In addition, in a case where the candidate setting value corresponding to the "narrow" word information is set to the platen gap setting item, when a person recognizes the "narrow" word information, the person can intuitively and sensibly recognize that the state of the platen gap is relatively narrow.

Although the word information is described by taking the platen gap item as an example, for example, the following word information is assigned to each of other setting items exemplified in the present embodiment.

For example, it is assumed that the tension level of the printing apparatus 3 of one model has nine levels of a level L1 to a level L9. The tension level increases in stages from the level L1 to the level L9. In addition, as the candidate setting values which can be set to the tension item of the printing apparatus 3 of one model, it is assumed that five values of "level L1", "level L3", "level L5", "level L7", and "level L9" are predetermined in advance. In this case, for example, "weak" word information is assigned to the candidate setting value of "level L1", "slightly weak" word information is assigned to the candidate setting value of "level L3", "normal" word information is assigned to the candidate setting value of "level L5", "slightly strong" word information is assigned to the candidate setting value of "level L7", and "strong" word information is assigned to the candidate setting value of "level L9".

In addition, for example, it is assumed that the suction force level of the printing apparatus 3 of one model has nine levels of a level L1 to a level L9. The suction force level increases in stages from the level L1 to the level L9. In addition, as the candidate setting values which can be set to the suction force item of the printing apparatus 3 of one model, it is assumed that five values of "level L1", "level L3", "level L5", "level L7", and "level L9" are predetermined in advance. In this case, for example, "weak" word information is assigned to the candidate setting value of "level L1", "slightly weak" word information is assigned to the candidate setting value of "level L3", "normal" word information is assigned to the candidate setting value of "level L5", "slightly strong" word information is assigned to the candidate setting value of "level L7", and "strong" word information is assigned to the candidate setting value of "level L9".

In addition, for example, it is assumed that the range of the heater temperature of the printing apparatus 3 of one model is "30° C." to "70° C.". In addition, as the candidate setting values which can be set to the heater temperature item of the printing apparatus 3 of one model, it is assumed that five values of "30° C.", "40° C.", "50° C.", "60° C.", and "70° C." are predetermined in advance. In this case, for example, "cold" word information is assigned to the candidate setting value of "30° C.", "slightly cold" word information is assigned to the candidate setting value of "40° C.", "normal" word information is assigned to the candidate setting value of "50° C.", "slightly hot" word information is assigned to the candidate setting value of "60° C.", and "hot" word information is assigned to the candidate setting value of "70° C.".

The word information corresponds to "label information".

As illustrated in FIG. 6, the print medium information registration screen G2 includes the input field N2b for inputting the word information on the platen gap item. The input field N2b is a pull-down menu. On the pull-down menu of the input field N2b, for the selected model (the model indicated by the model identification information which is input into the input field N1 of the model input screen G1 by the user), items of the word information assigned to each of the candidate setting values which can be set to the platen gap item are listed.

The medium provider selects the word information corresponding to an appropriate setting value which can be set to the platen gap item among the word information listed on the pull-down menu of the input field N2b. In response to the selection of the word information, the word information selected by the medium provider is input into the input field N2*b*. In advance, a test, a simulation, or the like related to the printing on the print medium by the printing apparatus 3 of the selected model is performed, and the medium provider selects the appropriate word information among the word information listed on the pull-down menu of the input field N2*b*.

Even for the input field N2*c* of the tension item, the input field N2*d* of the suction force item, and the input field N2*e* of the heater temperature item, the medium provider inputs the word information corresponding to an appropriate setting value which can be set to each of the setting items.

As described above, in registration of the print medium information, when designating the setting value to be set to each of the setting items, the medium provider only needs to select the word information assigned to the candidate setting value, and does not need to input a specific setting value. Therefore, convenience of the medium provider can be improved.

As illustrated in FIG. 6, the print medium information registration screen G2 includes an input field N2*f* for each printing mode of the printing apparatus 3. The input field N2*f* is an input field for inputting a color profile index. The color profile index is an index which is assigned for each color profile in order to identify the color profile. In the present embodiment, the color profile index is one alphabetic character. The color profile index corresponds to "label information" corresponding to the candidate setting value which can be set to "the item related to image processing to be executed when the image processing apparatus 6, which generates the raster data (print data) to be output to the printing apparatus 3, generates the raster data".

The input field N2*f* is a pull-down menu. On the pull-down menu of the input field N2*f* of one printing mode, when the printing apparatus 3 of the selected model is in the one printing mode, items of the color profile index of each color profile which can be used by the image processing apparatus 6 are listed. The medium provider inputs the color profile index into each of the input fields N2*f* by selecting one color profile index among the color profile indexes listed on the pull-down menu.

As illustrated in FIG. 6, the print medium information registration screen G2 includes a confirmation button BK2 for confirming the input into the input fields provided on the screen.

The medium provider inputs information into each input field on the print medium information registration screen G2, and operates the confirmation button BK2 (step S3).

As illustrated in the flowchart FA of FIG. 4, in response to the operation of the confirmation button BK2, the terminal 11 transmits the information which is input into each input field of the print medium information registration screen G2 to the medium server 8 by a function of a script implemented in the HTML file (step SA7).

As illustrated in the flowchart FB of FIG. 4, the server control unit 20 of the medium server 8 receives the information by controlling the server communication unit 21 (step SB5).

Next, the server control unit 20 generates print medium information based on the information received in step SB5 (step SB6).

Hereinafter, the print medium information will be described in detail.

FIG. 7 is a diagram illustrating an example of the print medium information.

The print medium information includes a first area A1 and a second area A2 following the first area A1.

In the first area A1 of the print medium information corresponding to the combination of the printing apparatus 3 of one model and one print medium, the word information corresponding to each of the setting items of the printing apparatus 3 of the one model is arranged in a predetermined order of the setting items by being segmented by a segmentation character. In addition, each word information included in the print medium information is word information corresponding to an appropriate candidate setting value which can be set to the setting item among the candidate setting values which can be set to the corresponding setting item.

In the first area A1 of the print medium information exemplified in FIG. 7, the word information corresponding to each setting item is arranged in an order of the platen gap item, the tension item, the suction force item, and the heater temperature item by being segmented by a segmentation character (in the present embodiment, a "/" character).

In addition, in the second area A2 of the print medium information corresponding to the combination of the printing apparatus 3 of one model and one print medium, the color profile index corresponding to each of the printing modes of the printing apparatus 3 of the one model is arranged in a predetermined order of the printing modes by being segmented by a segmentation character. In addition, each color profile index included in the print medium information is a color profile index corresponding to an appropriate color profile which can be used by the image processing apparatus 6 when the printing apparatus 3 is in the corresponding printing mode.

In the second area A2 of the print medium information exemplified in FIG. 7, color profile indexes corresponding to the four printing modes are arranged side by side in a predetermined order of the printing modes by being segmented by a segmentation character.

In step SB6, the server control unit 20 executes the following processing based on the information received in step SB5. That is, the information received in step SB5 includes the word information selected for each of the setting items by the medium provider. The server control unit 20 generates the first area A1 of the print medium information by arranging the word information included in the information received in step SB5 in a predetermined order which is determined for each selected model. In addition, the information received in step SB5 includes the color profile index selected for each of the printing modes by the medium provider. The server control unit 20 generates the second area A2 of the print medium information by arranging the color profile index included in the information received in step SB5 in a predetermined order which is determined for each selected model.

Here, the word information selected by the medium provider is word information corresponding to an appropriate candidate setting value which can be set to the setting item in the combination of the printing apparatus 3 of the selected model and the print medium to be registered. In addition, the color profile index selected by the medium provider is a color profile index of an appropriate color profile which can be used by the image processing apparatus 6 in the combination of the printing apparatus 3 of the selected model and the print medium to be registered.

As described above, in the first area A1 of the print medium information, the word information is arranged in the predetermined order of the setting items. In addition, each word information included in the print medium information is word information corresponding to the appropriate candidate setting value which can be set to the corresponding setting item. Since the print medium information has such a configuration, the following effects are obtained. That is, when a person recognizes the print medium information based on the combination of the printing apparatus 3 of one model and one print medium, the person can intuitively and sensibly recognize a state of the setting value to be set to the setting item of the printing apparatus 3 of the one model, and can estimate the characteristics (a material, a size, a strength, and the like) of the print medium. In addition, since the print medium information has a simple structure in which the word information is arranged in a predetermined order, the print medium information can be standardized by standardizing the word information and standardizing the order in which the word information is arranged. Thus, the print medium information is advantageous for standardization.

As illustrated in the flowchart FB of FIG. 4, after generating the print medium information in step SB6, the server control unit 20 registers the generated print medium information in the medium list 22*a* (step SB7).

The medium list 22*a* is a database including a record for each combination of the model of the printing apparatus 3 and the print medium.

FIG. 8 is a diagram illustrating contents of one record of the medium list 22*a*.

As illustrated in FIG. 8, one record of the medium list 22*a* includes the model identification information, printing apparatus provider identification information, print medium identification information, and print medium information.

The printing apparatus provider identification information is information for identifying an entity providing the printing apparatus 3 (hereinafter, referred to as a "printing apparatus provider") such as a company that manufactures and sells the printing apparatus 3 (for example, a so-called printer manufacturer).

In step SB7, the server control unit 20 registers a record including the model identification information of the selected model, the printing apparatus provider identification information of the entity providing the printing apparatus 3 of the selected model, the print medium identification information of the print medium to be registered, and the print medium information generated in step SB6, in the medium list 22*a*. In the server storage unit 22 of the medium server 8, the printing apparatus provider identification information of the entity providing the printing apparatus 3 is stored for each model of the printing apparatus 3 in correlation with the model identification information.

In this manner, one record of the medium list 22*a* includes the printing apparatus provider identification information. Therefore, in a case of searching a predetermined record from the records of the medium list 22*a*, it is possible to narrow down the search results using the printing apparatus provider identification information as a key, and thereby improving search efficiency and improving convenience. Instead of a configuration in which one record of the medium list 22*a* includes the printing apparatus provider identification information independently of the model identification information, a configuration in which the printing apparatus provider identification information is included in the model identification information, may be adopted.

By the processing of step SB7, registration of the print medium information to the medium list 22*a* is completed.

As described above, the medium server 8 stores the medium list 22*a*. The entity providing the medium server 8 does not need to be a single printing apparatus provider. For example, a configuration in which an entity different from the printing apparatus provider provides the medium server 8 that stores the medium list 22*a* corresponding to the model of the printing apparatus 3 provided by a plurality of different printing apparatus providers, may be adopted.

Next, the server control unit 20 generates an HTML file for displaying a registration completion notification screen G3 (FIG. 9), and transmits the HTML file to the terminal 11 (step SB8).

As illustrated in the flowchart FA of FIG. 4, the terminal 11 receives the HTML file (step SA8).

Next, the terminal 11 displays the registration completion notification screen G3 on the display section based on the received HTML file (step SA9).

Figure 9:
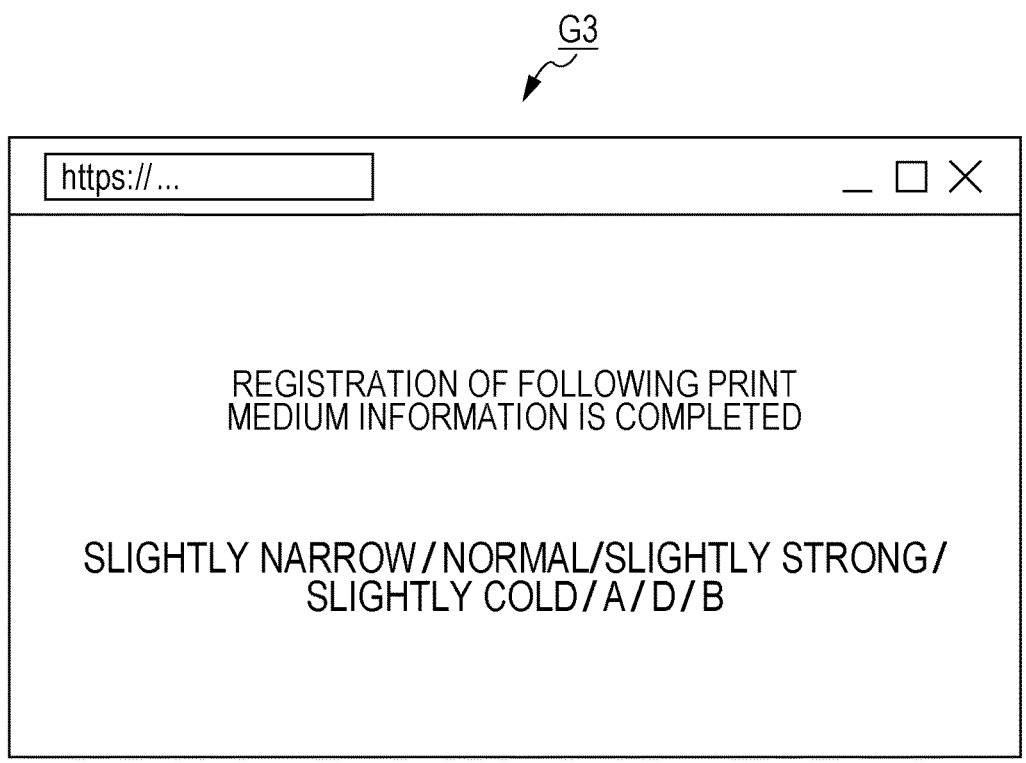
FIG. 9 is a diagram illustrating a registration completion notification screen.

FIG. 9 is a diagram illustrating the registration completion notification screen G3.

As illustrated in FIG. 9, on the registration completion notification screen G3, the print medium information and information indicating that registration of the print medium information is completed are displayed. By viewing the registration completion notification screen G3, the medium provider can recognize contents of the print medium information and completion of the registration of the print medium information.

Although a detailed explanation is omitted, the medium provider can change the contents of the print medium information registered in the medium list 22*a* by a predetermined method at an arbitrary timing. In addition, the medium provider can delete the record corresponding to the specific print medium information among the records registered in the medium list 22*a*.

Processing of Information Processing System 1 in a Case where Printing is Performed by Printing Apparatus 3.

Next, processing of each apparatus of the information processing system 1 in a case where printing is performed by the printing apparatus 3 will be described.

Figure 10:
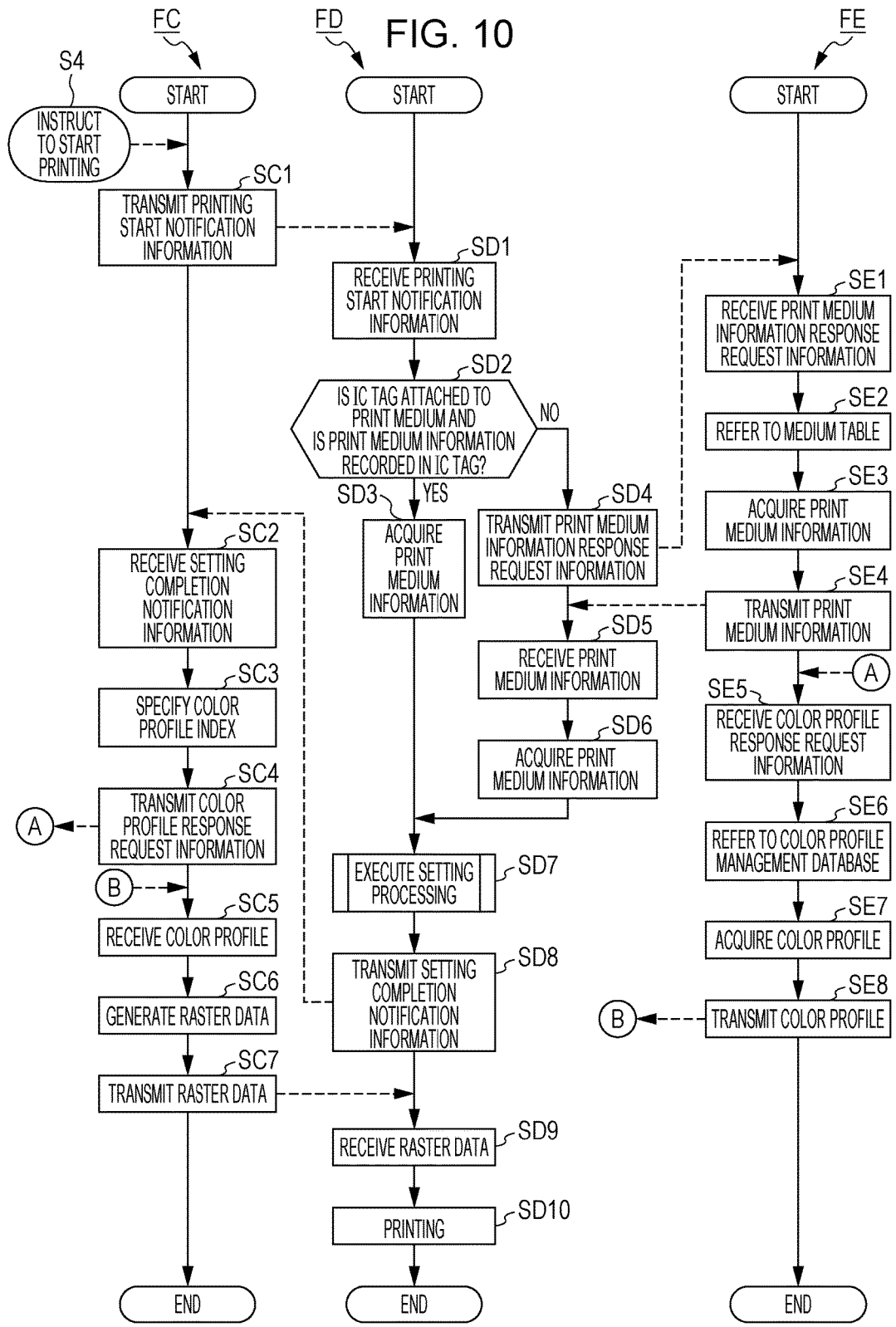
FIG. 10 is a flowchart illustrating operations of an image processing apparatus, a printing apparatus, and a control apparatus.

FIG. 10 is a flowchart illustrating operations of the image processing apparatus 6, the printing apparatus 3, and the control apparatus 5 in a case where printing is performed by the printing apparatus 3. A flowchart FC of FIG. 10 illustrates the operation of the image processing apparatus 6, a flowchart FD illustrates the operation of the printing apparatus 3, and a flowchart FE illustrates the operation of the control apparatus 5.

The image processing apparatus 6 executes processing of the flowchart FC in cooperation with software such as a program including the image processing program 52*a* and hardware such as the CPU and other components. The printing apparatus 3 executes processing of the flowchart FD in cooperation with software such as a program including the firmware 42*c* and hardware such as the CPU and other components. The control apparatus 5 executes processing of the flowchart FE in cooperation with software such as a program including the image processing program 52*a* and hardware such as the CPU and other components.

As illustrated in the flowchart FC of FIG. 10, in a case of performing printing by the printing apparatus 3, the user instructs the image processing apparatus 6 to start printing by a predetermined method (step S4). When instructing the start of printing, the user designates the printing apparatus 3 in which printing is to be performed. In the present embodiment, identification information for identifying the printing apparatus 3 (hereinafter, referred to as "printing apparatus identification information") is assigned to each printing apparatus 3, and the user designates the printing apparatus identification information on the image processing apparatus 6 by a predetermined method. The printing apparatus identification information may be, for example, unique information for each printing apparatus 3 (for example, a serial number.), or may be, for example, a name given to the printing apparatus 3 in order to identify the printing apparatus 3 in the local area network LNa.

In response to the instruction of start of printing by the user, the image-processing-apparatus control unit 50 of the image processing apparatus 6 transmits printing start notification information for notifying the start of printing to the printing apparatus 3 designated by the user by controlling the image-processing-apparatus communication unit 51 (step SC1).

The image-processing-apparatus storage unit 52 of the image processing apparatus 6 stores information required for communication with the printing apparatus 3 (information such as an IP address and a communication protocol used for communication) in correlation with the printing apparatus identification information for each of the printing apparatuses 3 connected to the local area network LNa.

As illustrated in the flowchart FD of FIG. 10, the printing-apparatus control unit 40 of the printing apparatus 3 receives printing start notification information by controlling the printing-apparatus communication unit 41 (step SD1).

In response to reception of the printing start notification information, the printing-apparatus control unit 40 executes the following processing by controlling the reading unit 43 (step SD2). That is, the printing-apparatus control unit 40 determines whether or not an IC tag is attached to the print medium loaded into the printing apparatus 3, and determines whether or not the print medium information is recorded in the IC tag in a case where the IC tag is attached to the print medium, by controlling the reading unit 43.

Here, in a case of providing one print medium to be used for the printing apparatus 3 of one model, the medium provider can provide the print medium to which the IC tag is attached, the IC tag in which the print medium information corresponding to the combination of the printing apparatus 3 of the one model and the one print medium is recorded. The IC tag is attached to a portion of the print medium that is not consumed by the printing apparatus 3 among portions of the print medium. For example, in a case where the print medium is roll paper, the IC tag is attached to the core of the roll paper.

A reading device of the reading unit 43 is provided at a position at which wireless communication with the IC tag can be performed in a state where the print medium to which the IC tag is attached is loaded into the printing apparatus 3.

In step SD2, in a case where it is determined that "the IC tag is attached to the print medium" and "the print medium information is recorded in the IC tag" (YES in step SD2), the printing-apparatus control unit 40 causes the processing procedure to transition to step SD3.

In step SD3, the printing-apparatus control unit 40 reads the print medium information from the IC tag by controlling the reading unit 43, and acquires the print medium information. After the processing of step SD3, the printing-apparatus control unit 40 causes the processing procedure transition to step SD7.

In step SD2, in a case where it is determined that "the IC tag is not attached to the print medium" or "the print medium information is not recorded in the IC tag attached to the print medium" (NO in step SD2), the printing-apparatus control unit 40 causes the processing procedure to transition to step SD4.

In step SD4, the printing-apparatus control unit 40 transmits print medium information response request information to the control apparatus 5 by controlling the printing-apparatus communication unit 41.

The print medium information response request information includes the model identification information of the model of the printing apparatus 3 and the print medium identification information of the print medium loaded into the printing apparatus 3. The print medium information response request information is information requesting transmission of the print medium information corresponding to the combination of the model with the model identification information and the print medium with the print medium identification information.

As illustrated in the flowchart FE of FIG. 10, the control-apparatus control unit 30 of the control apparatus 5 receives the print medium information response request information by controlling the control-apparatus communication unit 31 (step SE1).

Next, the control-apparatus control unit 30 refers to the medium table 32a stored in the control-apparatus storage unit 32 (step SE2).

The medium table 32a is a database including a record for each print medium which can be loaded into each of the printing apparatuses 3, the printing apparatuses 3 being connected to the local area network LNa.

Each record of the medium table 32a includes the printing apparatus identification information, the model identification information, the print medium identification information, and the print medium information. The record corresponding to one print medium which can be loaded into one printing apparatus 3 includes the printing apparatus identification information of the one printing apparatus 3, the model identification information of the model of the one printing apparatus 3, the print medium identification information of the one print medium, and the print medium information corresponding to the combination of the model of the one printing apparatus and the one print medium.

Figures 11, 12:
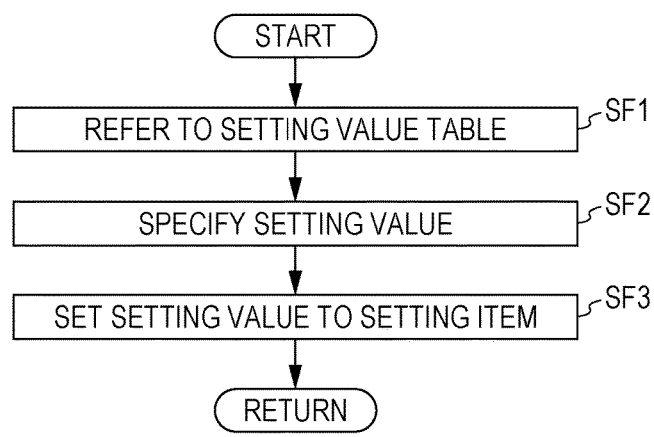
FIG. 11 is a diagram illustrating a medium table.
FIG. 12 is a flowchart illustrating details of setting processing.

FIG. 11 is a diagram illustrating an example of the contents of the medium table 32a in a manner suitable for explanation.

The medium table 32a of FIG. 11 is a table in the following cases. That is, the printing apparatus 3 (hereinafter, referred to as a "first printing apparatus") with the printing apparatus identification information of "aaa" and the model identification information of "KS01" and the printing apparatus 3 (hereinafter, referred to as "second printing apparatus") with the printing apparatus identification information of "bbb" and the model identification information of "KS02" are connected to the local area network LNa. The first printing apparatus can load a print medium with the print medium identification information of "MD01" and a print medium with the print medium identification information of "MD02". The second printing apparatus can load a print medium with the print medium identification information of "MD02" and a print medium with the print medium identification information of "MD03".

In this case, as illustrated in FIG. 11, for the first printing apparatus, the medium table 32a includes a record R1 corresponding to the print medium with the print medium identification information of "MD01" and a record R2 corresponding to the print medium with the print medium identification information of "MD02", the print mediums capable of being loaded into the first printing apparatus. In addition, for the second printing apparatus, the medium table 32a includes a record R3 corresponding to the print medium with the print medium identification information of "MD02" and a record R4 corresponding to the print medium with the print medium identification information of "MD03", the print mediums capable of being loaded into the second printing apparatus.

The control-apparatus control unit 30 performs synchronization for the print medium information corresponding to the combination of the model of the printing apparatus 3 and the print medium such that the print medium information of the medium list 22a and the print medium information of the medium table 32a have the same contents, by appropriately performing communication with the medium server 8.

In addition, in the present embodiment, a configuration in which the printing apparatus 3 transmits the print medium information response request information to the control apparatus 5 and the control apparatus 5 responds to the information, is adopted. In this regard, a configuration in which the printing apparatus 3 transmits the print medium information response request information to the medium server 8 and the medium server 8 responds to the information, may be adopted.

As illustrated in the flowchart FE of FIG. 10, after referring to the medium table 32a in step SE2, the control-apparatus control unit 30 specifies the corresponding record by comparing the combination of the model identification information and the print medium identification information included in the print medium information response request information and the combination of the model identification information and the print medium identification information included in each record of the medium table 32a. The control-apparatus control unit 30 acquires the print medium information included in the specified record (step SE3).

Next, the control-apparatus control unit 30 transmits the print medium information acquired in step SE3 to the printing apparatus 3 by controlling the control-apparatus communication unit 31 (step SE4).

As illustrated in the flowchart FD of FIG. 10, the printing-apparatus control unit 40 of the printing apparatus 3 receives the printing medium information by controlling the printing-apparatus communication unit 41 (step SD5).

Next, the printing-apparatus control unit 40 acquires the received print medium information (step SD6). After the processing of step SD6, the printing-apparatus control unit 40 causes the processing procedure transition to step SD7.

In step SD7, the printing-apparatus control unit 40 executes setting processing based on the print medium information acquired in step SD3 or the print medium information acquired in step SD6. Hereinafter, the print medium information acquired in step SD3 or the print medium information acquired in step SD6 is referred to as "acquired print medium information". The acquired print medium information is print medium information corresponding to the combination of the model of the printing apparatus 3 and the print medium loaded into the printing apparatus 3.

A flowchart FF in FIG. 12 is a flowchart illustrating details of the setting processing.

As illustrated in the flowchart FF of FIG. 12, in the setting processing, the printing-apparatus control unit 40 refers to the setting value table 42a (step SF1).

The setting value table 42a includes the following records for each print medium which can be loaded into the printing apparatus 3. That is, the setting value table 42a includes records in which the setting item identification information, each candidate setting value, and the word information assigned to each candidate setting value are correlated with each other for each setting item. The candidate setting value is a specific value.

FIG. 13 is a diagram illustrating an example of the contents of the setting value table 42a in a manner suitable for explanation.

The setting value table 42a of FIG. 13 is a table in the following cases. That is, a print medium with the print medium identification information of "MD01" and a print medium with the print medium identification information of "MD02" can be loaded into the printing apparatus 3.

In a record R5 of the setting value table 42a of FIG. 13, for the platen gap item in a case of the print medium identification information of "MD01", the setting item identification information of the platen gap item, one candidate setting value (in the example of FIG. 13, "1.0 mm"), and the word information assigned to the candidate setting value (in the example of FIG. 13, "narrow") are correlated with each other.

In addition, in a record R6 of the setting value table 42a of FIG. 13, for the tension item in a case of the print medium identification information of "MD01", the setting item identification information of the tension item, one candidate setting value (in the example of FIG. 13, "Level L1"), and the word information assigned to the candidate setting value (in the example of FIG. 13, "weak") are correlated with each other.

After referring to the setting value table 42a in step SF1, the printing-apparatus control unit 40 specifies the setting value to be set to each setting item based on the acquired print medium information (step SF2).

Hereinafter, the processing in step SF2 will be described in detail by taking a case of specifying the setting value to be set to the platen gap item as an example.

Based on the acquired print medium information, the printing-apparatus control unit 40 specifies the word information corresponding to the platen gap item from the word information included in the information. As described above, in the print medium information, the word information is arranged in a predetermined order of the setting items, and thus the printing-apparatus control unit 40 specifies the word information corresponding to the platen gap item based on the predetermined order. Next, the printing-apparatus control unit 40 specifies, among the records of the setting value table 42a, a record with a combination of the print medium identification information of the print medium loaded into the printing apparatus 3, the setting item identification information of the platen gap item, and the specified word information. The printing-apparatus control unit 40 acquires the print medium identification information of the print medium loaded into the printing apparatus 3 by a predetermined method. For example, the printing-apparatus control unit 40 receives an input designating the print medium loaded into the printing apparatus 3 from the user, and acquires the print medium identification information based on the input. Next, the printing-apparatus control unit 40 specifies the candidate setting value included in the specified record as the setting value to be set to the platen gap item.

After specifying the setting value to be set to each setting item in step SF2, the printing-apparatus control unit 40 refers to the setting file 42b, describes the specified setting value in correlation with the setting item identification information for each of the setting items (step SF3), and ends the setting processing. By the processing of step SF3, setting of the setting values to the setting items is completed.

In the present embodiment, "processing of acquiring the printing medium information, determining the setting value from the word information included in the information, and setting the setting value to the setting item (processing corresponding to a series of processing of step SD2 to step SD7)" is performed at a timing when printing is performed after the print medium is loaded into the printing apparatus 3. In this regard, the processing may be performed at a timing when the print medium is loaded into the printing apparatus 3.

As described above, in the present embodiment, the setting value table 42a is stored in the printing apparatus 3, and the printing-apparatus control unit 40 sets the setting value to the setting item based on the setting value table 42a stored in the printing apparatus 3. Therefore, the printing apparatus 3 does not need to access an external apparatus so as to acquire information required for setting of the setting values, and thereby improving processing efficiency.

As illustrated in the flowchart FD of FIG. 10, after executing the setting processing in step SD7, the printing-apparatus control unit 40 transmits setting completion notification information to the image processing apparatus 6 by controlling the printing-apparatus communication unit 41 (step SD8).

The setting completion notification information includes information indicating the current printing mode of the printing apparatus 3 (hereinafter, referred to as "printing mode identification information") and the acquired print medium information. The setting completion notification information is information for notifying that setting of the setting values to the setting items is completed.

As illustrated in the flowchart FC of FIG. 10, the image-processing-apparatus control unit 50 of the image processing apparatus 6 receives the setting completion notification information by controlling the image-processing-apparatus communication unit 51 (step SC2).

Next, in a case of executing the image processing for generating the raster data, the image-processing-apparatus control unit 50 specifies the color profile index of the color profile to be used based on the printing mode identification information included in the setting completion notification information received in step SC2 and the acquired print medium information (step SC3). As described above, in the print medium information, the color profile index is arranged in the predetermined order of the printing modes, and thus the image-processing-apparatus control unit 50 specifies the color profile index corresponding to the current printing mode of the printing apparatus 3 based on the order.

Next, the image-processing-apparatus control unit 50 transmits color profile response request information to the control apparatus 5 by controlling the image-processing-apparatus communication unit 51 (step SC4).

The color profile response request information includes the color profile index specified in step SC3. The color profile response request information is information requesting transmission of the color profile with the color profile index included in the information.

As illustrated in the flowchart FE of FIG. 10, the control-apparatus control unit 30 of the control apparatus 5 receives the color profile response request information by controlling the control-apparatus communication unit 31 (step SE5).

Next, the control-apparatus control unit 30 refers to the color profile table 32b stored in the control-apparatus storage unit 32 (step SE6).

The color profile table 32b is a database in which a color profile index and a color profile (a substantial color profile with a file format) are stored in correlation with each other for each color profile.

Here, the server storage unit 22 of the medium server 8 stores the color profile management database 22b. Similar to the color profile table 32b, the color profile management database 22b is a database in which a color profile index and a color profile (a substantial color profile with a file format) are stored in correlation with each other. The contents of the color profile stored in the color profile management database 22b can be updated by a person with administrative rights by a predetermined method. The control-apparatus control unit 30 performs synchronization of the color profile table 32b and the color profile management database 22b such that each color profile stored in the color profile table 32b and each color profile stored in the color profile management database 22b have the same contents, by appropriately performing communication with the medium server 8.

Next, the control-apparatus control unit 30 acquires, from the color profile table 32b referred to in step SE6, the color profile correlated with the color profile index included in the color profile response request information received in step SE5 (step SE7).

Next, the control-apparatus control unit 30 transmits the color profile acquired in step SE7 to the image processing apparatus 6 by controlling the control-apparatus communication unit 31 (step SE8).

As illustrated in the flowchart FC of FIG. 10, the image-processing-apparatus control unit 50 of the image processing apparatus 6 receives the color profile by controlling the image-processing-apparatus communication unit 51 (step SC5).

Next, the image-processing-apparatus control unit 50 generates the raster data using the color profile received in step SC5 by at least a function of the RIP software (step SC6). It is assumed that data required for generating the raster data is input to the RIP software in advance. The data required for generating the raster data is, for example, image data of an image including a text generated by word processing software, image data of a graphic image generated by drawing software, or image data of a captured image captured by a digital camera.

After generating the raster data, the image-processing-apparatus control unit 50 transmits the generated raster data to the printing apparatus 3 by controlling the image-processing-apparatus communication unit 51 (step SC7).

As illustrated in the flowchart FD of FIG. 10, the printing-apparatus control unit 40 of the printing apparatus 3 receives the raster data (step SD9).

Next, the printing-apparatus control unit 40 causes the printing unit 44 to print the image on the print medium by controlling the printing unit 44 based on the raster data received in step SD9 (step SD10). As described above, the printing-apparatus control unit 40 reflects the setting value which is set to the setting item, and executes printing.

As described above, the information processing system 1 according to the present embodiment sets the setting value corresponding to the combination of the model of the printing apparatus 3 and the print medium on which printing is performed for each setting item of the printing apparatus 3, and performs printing. The information processing system 1 includes the setting value table 42a in which the candidate setting values that can be set to the setting items are stored in correlation with the word information (label information) corresponding to each of the candidate setting values. In a case of setting the setting value to the setting item of the printing apparatus 3, the information processing system 1 determines the setting value corresponding to the setting item based on the print medium information including the word information (label information) by using the setting value table 42a, and sets the determined setting value to the setting item.

According to this configuration, it is sufficient to manage the print medium information including the word information for each combination of the model of the printing apparatus 3 and the print medium, as information on the setting of the setting value to the setting item of the printing apparatus 3, without managing a specific setting value to be set to the setting item. Thus, it is possible to simplify management of the information on the setting value to be set to the setting item for each combination of the model of the printing apparatus and the print medium. In addition, the setting of the setting value to the setting item can be performed using the setting value table 42*a* based on the print medium information. Thus, for example, the user does not need to input a specific setting value for each setting item, thereby simplifying the setting of the setting value to the setting item.

In addition, in the present embodiment, the word information is obtained by assigning a word with a different description to each candidate setting value for each setting item. The print medium information includes the word information corresponding to the setting value to be set to each setting item for the combination of the model of the printing apparatus 3 and the print medium. The information processing system 1 determines the setting value corresponding to the setting item by specifying the setting value from the word information included in the print medium information by using the setting value table 42*a*.

According to this configuration, it is possible to accurately determine the setting value corresponding to the setting item by using the setting value table 42*a* based on the print medium information.

In addition, in the present embodiment, the word information is obtained by describing the degree of the state of the setting item using a word in a case where the setting value is set to the setting item.

According to this configuration, when a person recognizes the word information, the person can intuitively and sensibly recognize the degree of the state of the setting item in the case where the setting value corresponding to the word information is set to the setting item.

In addition, in the present embodiment, the setting value table 42*a* is stored (included) in the printing apparatus 3.

According to this configuration, when setting the setting value to the setting item, the printing apparatus 3 can set the setting value to the setting item by using the setting value table 42*a* stored in the printing apparatus 3 without accessing an external apparatus to acquire required information, and thereby improving the processing efficiency. The color profile table 32*b* and the setting value table 42*a* may be stored in the control apparatus 5 or the medium server 8.

In addition, in the present embodiment, the print medium information may be recorded in the print medium in a readable state.

According to this configuration, the printing apparatus 3 can acquire the print medium information by reading the print medium information from the print medium. Thereby, for example, the printing apparatus 3 does not need to access an external apparatus so as to acquire the print medium information, and thus the processing efficiency can be improved. Further, the user does not need to perform work such as inputting of the print medium information, and thus convenience of the user can be improved.

In addition, in the present embodiment, the print medium information is recorded in the IC tag attached to the portion of the print medium that is not consumed by the printing apparatus 3 among portions of the print medium.

According to this configuration, the printing apparatus 3 can accurately acquire the print medium information from the IC tag attached to the print medium which is actually loaded into the printing apparatus 3.

In addition, in the present embodiment, the print medium information is stored in the medium server 8 (server) that can perform communication with the printing apparatus 3 via the global network.

According to this configuration, the medium server 8 can provide the print medium information to an apparatus that can perform communication with the medium server 8 as necessary.

In addition, in the present embodiment, when the print medium is loaded into the printing apparatus 3 and printing is performed, the processing of determining the setting value from the word information and setting the determined setting value to the setting item is performed.

According to this configuration, before printing is performed, an appropriate setting value corresponding to the print medium on which printing is actually performed can be set to the setting item of the printing apparatus 3.

In addition, in the present embodiment, at a timing when the print medium is loaded into the printing apparatus 3, the processing of determining the setting value from the word information included in the print medium information and setting the determined setting value to the setting item may be performed.

According to this configuration, when the print medium loaded into the printing apparatus 3 is replaced, an appropriate setting value corresponding to the replaced print medium can be set to the setting item of the printing apparatus 3.

In addition, in the present embodiment, the setting items include an item related to a mechanism to be used for printing on the print medium by the printing apparatus 3.

According to this configuration, the setting value can be accurately set to the item related to the mechanism to be used for printing on the print medium by the printing apparatus 3.

In addition, in the present embodiment, the setting items include the item related to image processing to be executed when the image processing apparatus 6, which generates the raster data (print data) to be output to the printing apparatus 3, generates the raster data.

According to this configuration, the setting value can be accurately set to the item related to image processing to be executed when the image processing apparatus 6 generates the raster data.

Second Embodiment

Next, a second embodiment will be described.

In the first embodiment described above, a configuration in which the word information is arranged in the first area A1 of the print medium information in the predetermined order of the setting items, is adopted. On the other hand, in the second embodiment, instead of the word information, a setting value index (index) is arranged in the first area A1 of the print medium information in the predetermined order of the setting items.

The setting value index is a character which is assigned to each candidate setting value in advance, and functions as an index representing the candidate setting value. As an example, the index is a character of one or more alphabets (for example, "A", "B", "XX", or the like), or is, for example, a character of one or more numbers (for example, "1", "2", "10", or the like). Each setting value index assigned to each candidate setting value of one setting item is a character different from those of other indexes.

For example, in a case where there are "1.0 mm", "3.0 mm", "5.0 mm", "7.0 mm", and "9.0 mm" as the candidate setting values of the platen gap item, a setting value index of "A" is assigned to the candidate setting value of "1.0 mm", a setting value index of "B" is assigned to the candidate setting value of "3.0 mm", a setting value index of "C" is assigned to the candidate setting value of "5.0 mm", a setting value index of "D" is assigned to the candidate setting value of "7.0 mm", and a setting value index of "E" is assigned to the candidate setting value of "9.0 mm".

The setting value index is information expressing the candidate setting value by not a specific value but in an abstract way, and corresponds to "label information".

Figure 14:
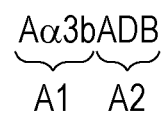
FIG. 14 is a diagram illustrating the print medium information according to a second embodiment.

FIG. 14 is a diagram illustrating an example of the print medium information according to the present embodiment.

In the first area A1 of the print medium information exemplified in FIG. 14, the setting value index corresponding to each setting item is arranged in an order of the platen gap item, the tension item, the suction force item, and the heater temperature item without being segmented by a segmentation character. More specifically, in the print medium information exemplified in FIG. 14, a first character of "A" is the setting value index assigned to the candidate setting value of the platen gap item, a second character of "a" is the setting value index assigned to the candidate setting value of the tension item, a third character of "3" is the setting value index assigned to the candidate setting value of the suction force item, and a fourth character of "b" is the setting value index assigned to the candidate setting value of the heater temperature item.

Even in the case where the setting value index is arranged in the print medium information in a predetermined order, the same effect as the case where the word information is arranged in a predetermined order can be obtained. That is, when a person, who knows the order of the setting value indexes assigned to the candidate setting values and the order of the setting items in the print medium information, recognizes the print medium information based on the combination of the printing apparatus 3 of one model and one print medium, the person can intuitively and sensibly recognize a state of the setting value to be set to the setting item of the printing apparatus 3 of the one model, and can estimate the characteristics of the print medium. In addition, since the print medium information has a simple structure in which the setting value index is arranged in a predetermined order, the print medium information can be standardized by standardizing the setting value index and standardizing the order in which the setting value index is arranged. Thus, the print medium information is advantageous for standardization.

In the second embodiment, registration of the print medium information in the medium list 22*a* is performed in the same manner as in the first embodiment.

FIG. 15 is a diagram illustrating an example of the contents of the setting value table 42*a* according to the second embodiment in a manner suitable for explanation.

The contents of the setting value table 42*a* exemplified in FIG. 15 correspond to the contents of the setting value table 42*a* exemplified in FIG. 13.

As is apparent from a comparison between FIG. 13 and FIG. 15, in the second embodiment, in each record of the setting value table 42*a*, the setting value index is correlated with the candidate setting value instead of the word information.

In the second embodiment, the setting of the setting value to the setting item of the printing apparatus 3 is performed in the same manner as in the first embodiment. That is, the printing apparatus 3 executes the setting of the setting value to the setting item using the setting value table 42*a* in which the setting value index and the candidate setting value are correlated with each other as in the setting value table 42*a* exemplified in FIG. 15.

As described above, in the second embodiment, the setting value index included in the print medium information is obtained by assigning an index, which is expressed by a different character for each setting item, to each candidate setting value. The print medium information includes the setting value index corresponding to the setting value to be set to each setting item for the combination of the model of the printing apparatus 3 and the print medium. The printing apparatus 3 determines the setting value corresponding to the setting item by specifying the setting value from the setting value index included in the print medium information by using the setting value table 42*a*.

According to this configuration, it is possible to accurately determine the setting value corresponding to the setting item by using the setting value table 42*a* based on the print medium information.

Third Embodiment

Next, a third embodiment will be described.

The contents of the print medium information according to the third embodiment are the same as the contents of the print medium information according to the second embodiment. That is, in the first area A1 of the print medium information according to the third embodiment, the setting value index is arranged in the predetermined order of the setting items.

The contents of the setting value table 42*a* according to the third embodiment are the same as the contents of the setting value table 42*a* according to the first embodiment. That is, in each record of the setting value table 42*a* according to the third embodiment, the word information and the candidate setting value are correlated with each other.

In addition, in the third embodiment, the server storage unit 22 of the medium server 8 stores a label correspondence table 22*b*.

FIG. 16 is a diagram illustrating an example of the contents of the label correspondence table 22*b* in a manner suitable for explanation.

The label correspondence table 22*b* includes the following records for each combination of the model of the printing apparatus 3 and the print medium. That is, the label correspondence table 22*b* includes records in which each setting value index assigned to the candidate setting value and each word information assigned to the candidate setting value are correlated with each other for each setting item. The candidate setting value is a specific value.

As illustrated in FIG. 16, one record of the label correspondence table 22*b* includes the model identification information, the print medium identification information, the setting item identification information, the setting value index, and the word information.

In the third embodiment, when setting the setting value to the setting item, the printing apparatus 3 executes the following processing.

That is, the printing-apparatus control unit 40 of the printing apparatus 3 acquires the print medium information in the same manner as in the first embodiment. As described in the first embodiment, the printing-apparatus control unit 40 acquires the print medium information by reading the print medium information from the IC tag, and acquires the print medium information by inquiring the information of the control apparatus 5. Here, the acquired print medium information is not word information but information including the setting value index. Hereinafter, the print medium information including the setting value index is referred to as first print medium information for convenience.

Next, the printing-apparatus control unit 40 transmits print medium information conversion request information to the medium server 8 by controlling the printing-apparatus communication unit 41. The print medium information conversion request information includes the first print medium information, the model identification information of the model of the printing apparatus 3, and the print medium identification information of the print medium loaded into the printing apparatus 3. The print medium information conversion request information is information requesting conversion of the first print medium information into print medium information including word information (hereinafter, referred to as "second print medium information" for convenience) and transmission of the second print medium information.

The server control unit 20 of the medium server 8 receives the print medium information conversion request information by controlling the server communication unit 21.

Next, the server control unit 20 refers to the label correspondence table 22b, and converts the first print medium information included in the received print medium information conversion request information into the second print medium information based on the table. As described above, in the label correspondence table 22b, for each combination of the model of the printing apparatus 3 and the print medium, each setting value index assigned to the candidate setting value and each word information assigned to the candidate setting value are correlated with each other for each setting item. Therefore, the server control unit 20 can convert the first print medium information into the second print medium information based on the label correspondence table 22b and the information included in the print medium information conversion request information.

After converting the first print medium information into the second print medium information, the server control unit 20 transmits the second print medium information to the printing apparatus 3 by controlling the server communication unit 21.

The printing-apparatus control unit 40 of the printing apparatus 3 receives the second print medium information by controlling the printing-apparatus communication unit 41.

Next, the printing-apparatus control unit 40 sets the setting value to the setting item by performing the setting processing which is described with reference to the flowchart FF of FIG. 12.

As described above, in the third embodiment, the print medium information includes the index corresponding to the setting value to be set to each setting item for the combination of the model of the printing apparatus 3 and the print medium. The setting value table 42a stores the setting value in correlation with the word information. The information processing system 1 includes the label correspondence table 22b that stores the word information in correlation with the setting value index. The information processing system 1 specifies the word information from the setting value index included in the print medium information by using the label correspondence table 22b, and determines the setting value corresponding to the setting item by specifying the setting value corresponding to the specified word information by using the setting value table 42a.

According to this configuration, it is possible to accurately set the setting value to the setting item of the printing apparatus 3 based on the print medium information including the setting value index by using the label correspondence table 22b and the setting value table 42a.

In addition, in the third embodiment, the label correspondence table 22b is stored (included) in the medium server 8 that can perform communication with the printing apparatus 3 via the global network GN (network).

According to this configuration, the medium server 8 can centrally manage a correspondence relationship between the setting value index and the word information for each combination of the model of the printing apparatus 3 and the print medium.

In the third embodiment, although the label correspondence table 22b is stored in the medium server 8, the label correspondence table 22b may be stored in an apparatus that can perform communication with the printing apparatus 3. In addition, the label correspondence table 22b may be stored in the printing apparatus 3.

The above-described embodiments have been presented by way of example only, and can be arbitrarily modified and applied within the scope of the invention.

For example, although the embodiment has been described by taking a case where the printing apparatus 3 is an LFP as an example, the printing apparatus 3 is not limited to the LFP. In addition, although the embodiment has been described by taking a case where the printing apparatus 3 is an ink jet printer as an example, a printing method of the printing apparatus 3 is not limited to the ink jet method. That is, the printing apparatus 3 may be any apparatus having a function of performing printing on the print medium.

In addition, although the embodiment has been described by taking a case where the setting of the setting value to the setting item is performed by describing the setting value in the setting file 42b, as an example, a method of setting the setting value to the setting item is not limited to the method of describing the setting value in the setting file 42b. For example, the setting value may be written in a variable of a predetermined program for controlling the printing apparatus 3.

In addition, the functional blocks described with reference to the drawings are presented for easy understanding of the invention, and are illustrated in the schematic diagrams by dividing the functional configuration of each apparatus according to the main processing contents. The configuration of each apparatus may be divided into more components according to the processing contents. In addition, one component may be divided so as to perform more processing contents. In addition, the processing of each component may be executed by one piece of hardware or may be executed by a plurality of pieces of hardware. In addition, the processing of each component may be realized by one program or may be realized by a plurality of programs.

In addition, processing units in the flowcharts illustrated in the drawings are presented for easy understanding of the processing in each apparatus, and are divided according to the main processing contents. The invention is not limited by a division method and a name of the processing unit. The processing of each apparatus may be divided into more processing units according to the processing contents. In addition, one processing unit may be divided so as to include more processing contents. In addition, as long as the same processing can be performed, the order of the processing of the flowchart is not limited to the example illustrated in the drawings.

What is claimed is:

1. An information processing system that sets a setting value corresponding to a combination of a model of a printing apparatus and a print medium on which printing is performed to a setting item of the printing apparatus and that executes printing, the system comprising:
- a setting value table which stores a candidate setting value that can be set to the setting item in correlation with label information corresponding to each candidate setting value,
- wherein, in a case of setting the setting value to the setting item of the printing apparatus, the information processing system determines the setting value corresponding to the setting item based on print medium information including the label information by using the setting value table, and sets the determined setting value to the setting item.

2. The information processing system according to claim 1,
- wherein the label information is obtained by assigning a word with a different description to each candidate setting value for each setting item,
- wherein the print medium information includes the word corresponding to the setting value to be set to each setting item for the combination of the model of the printing apparatus and the print medium, and
- wherein the information processing system determines the setting value corresponding to the setting item by specifying the setting value from the word included in the print medium information by using the setting value table.

3. The information processing system according to claim 2,
- wherein the word is obtained by describing a degree of a state of the setting item using a word in a case where the setting value is set to the setting item.

4. The information processing system according to claim 1,
- wherein the label information is obtained by assigning an index represented by a different character to each candidate setting value for each setting item,
- wherein the print medium information includes the index corresponding to the setting value to be set to each setting item for the combination of the model of the printing apparatus and the print medium, and
- wherein the information processing system determines the setting value corresponding to the setting item by specifying the setting value from the index included in the print medium information by using the setting value table.

5. The information processing system according to claim 1,
- wherein the label information includes information obtained by assigning a word with a different description to each candidate setting value for each setting item and information obtained by assigning an index represented by a different character to each candidate setting value for each setting item,
- wherein the print medium information includes the index corresponding to the setting value to be set to each setting item for the combination of the model of the printing apparatus and the print medium,
- wherein the setting value table stores the setting value in correlation with the word,
- wherein the information processing system includes a label correspondence table that stores the word in correlation with the index, and
- wherein the information processing system determines the setting value corresponding to the setting item by specifying the word from the index included in the print medium information by using the label correspondence table and specifying the setting value corresponding to the specified word by using the setting value table.

6. The information processing system according to claim 5,
- wherein the word is obtained by describing a degree of a state of the setting item using a word in a case where the setting value is set to the setting item.

7. The information processing system according to claim 5,
- wherein the label correspondence table is stored in an apparatus that can perform communication with the printing apparatus via a network.

8. The information processing system according to claim 1,
- wherein the setting value table is included in the printing apparatus.

9. The information processing system according to claim 1,
- wherein the print medium information is recorded in the print medium in a readable state.

10. The information processing system according to claim 9,
- wherein the print medium information is recorded in an IC tag attached to a portion of the print medium that is not consumed by the printing apparatus among portions of the print medium.

11. The information processing system according to claim 1,
- wherein the print medium information is stored in a server that can perform communication with the printing apparatus via a global network.

12. The information processing system according to claim 1,
- wherein processing of determining the setting value from the label information and setting the determined setting value to the setting item is performed at a timing when the print medium is loaded into the printing apparatus.

13. The information processing system according to claim 1,
- wherein processing of determining the setting value from the label information and setting the determined setting value to the setting item is performed when the print medium is loaded into the printing apparatus and printing is performed.

14. The information processing system according to claim 1,
- wherein the setting item includes an item related to a mechanism to be used for printing on the print medium by the printing apparatus.

15. The information processing system according to claim 1,
- wherein the setting item includes an item related to image processing to be executed when an image processing apparatus, which generates print data to be output to the printing apparatus, generates the print data.

16. A control method of an information processing system that sets a setting value corresponding to a combination of a model of a printing apparatus and a print medium on which printing is performed to a setting item of a printing apparatus and executes printing, the method comprising:
- acquiring label information from print medium information;
- determining the setting value corresponding to the setting item by using a setting value table which stores a candidate setting value that can be set to the setting item in correlation with the label information corresponding to each candidate setting value; and setting the determined setting value to the setting item.

17. A printing apparatus that performs printing on a print medium, the apparatus comprising:

a setting value table which stores a candidate setting value that can be set to a setting item related to the print medium in correlation with label information corresponding to each candidate setting value, wherein the printing apparatus determines the setting value based on print medium information including the label information corresponding to the setting value to be set to the setting item by using the setting value table, and performs printing by setting the determined setting value to the setting item.

* * * * *